US008286167B2

(12) United States Patent
Takahashi

(10) Patent No.: US 8,286,167 B2
(45) Date of Patent: Oct. 9, 2012

(54) IMAGE PROCESSING APPARATUS, JOB MANAGEMENT METHOD, AND STORAGE MEDIUM

(75) Inventor: Hisanori Takahashi, Chiba (JP)

(73) Assignee: Ricoh Company, Ltd., Tokyo (JP)

(*) Notice: Subject to any disclaimer, the term of this patent is extended or adjusted under 35 U.S.C. 154(b) by 1323 days.

(21) Appl. No.: 11/946,468

(22) Filed: Nov. 28, 2007

(65) Prior Publication Data

US 2008/0134179 A1     Jun. 5, 2008

(30) Foreign Application Priority Data

Dec. 1, 2006  (JP) ................................. 2006-325993
Nov. 13, 2007 (JP) ................................. 2007-294844

(51) Int. Cl.
*G06F 9/46* (2006.01)
*G06F 15/16* (2006.01)
*G06F 3/12* (2006.01)

(52) U.S. Cl. .......................... 718/100; 709/201; 358/1.1
(58) Field of Classification Search .................. None
See application file for complete search history.

(56) References Cited

U.S. PATENT DOCUMENTS 8,056,079 B1 * 11/2011 Martin et al. ............... 718/102
2005/0260009 A1 * 11/2005 Namizuka et al. ........... 399/80
2006/0077417 A1 * 4/2006 Nakata et al. ............. 358/1.14

FOREIGN PATENT DOCUMENTS

| JP | 2004-151893 | 5/2004 |
| JP | 2004-287862 | 10/2004 |
| JP | 2004-326601 | 11/2004 |
| JP | 2006-59199  | 3/2006 |
| JP | 2006-311456 | 11/2006 |

OTHER PUBLICATIONS

Office Action issued Jan. 17, 2012 in Japan Application No. 2007-294844.

* cited by examiner

*Primary Examiner* — Kenneth Tang
(74) *Attorney, Agent, or Firm* — Oblon, Spivak, McClelland, Maier & Neustadt, L.L.P.

(57) ABSTRACT

An image processing apparatus where a job is implemented by one or more constituent functions is disclosed. The image processing apparatus includes a control unit configured to display states of the job and the constituent functions, to allow a user to select one of the constituent functions and add a subsequent function after the selected one of the constituent functions, and to receive a request to execute the job.

20 Claims, 30 Drawing Sheets

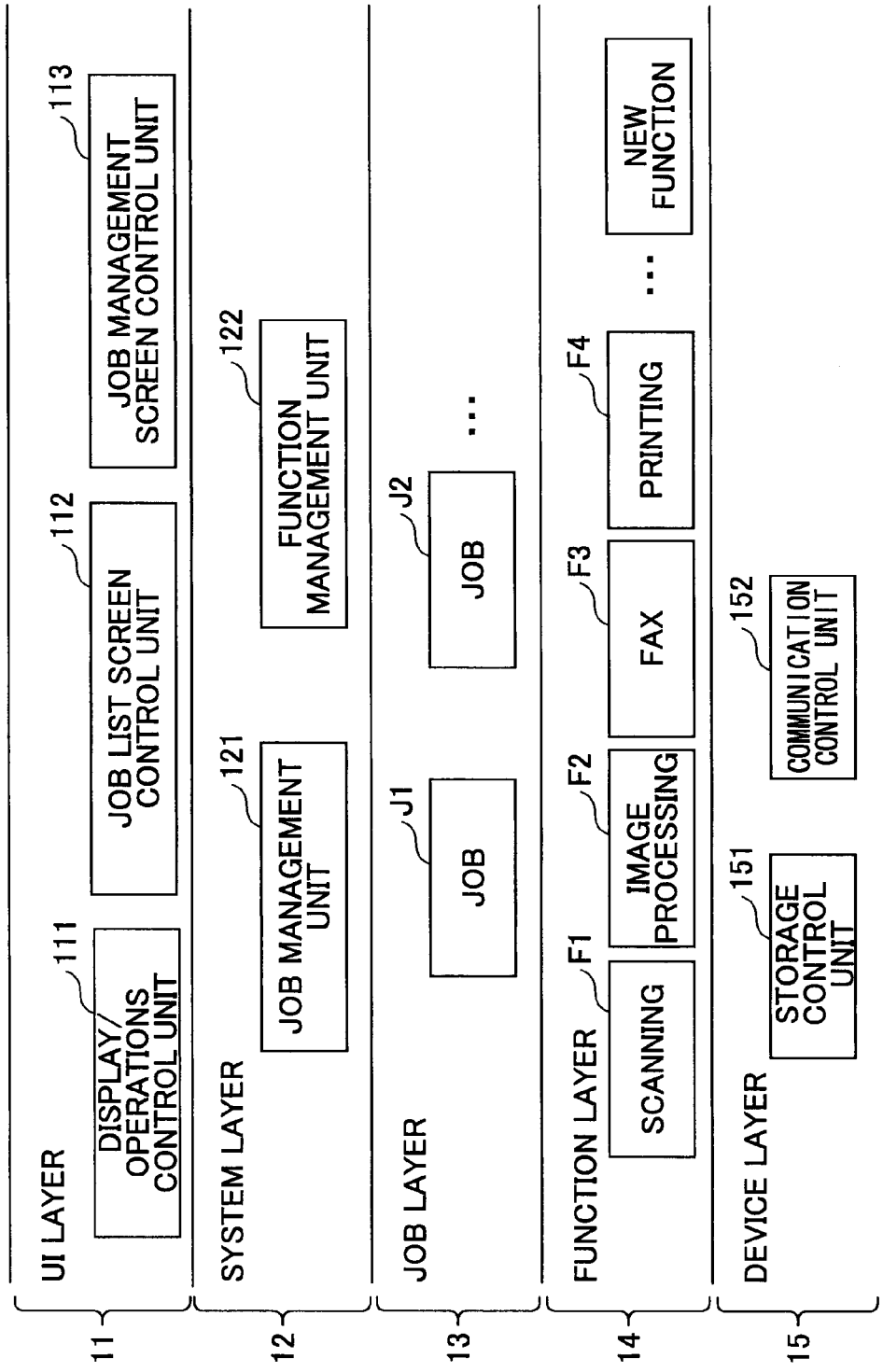

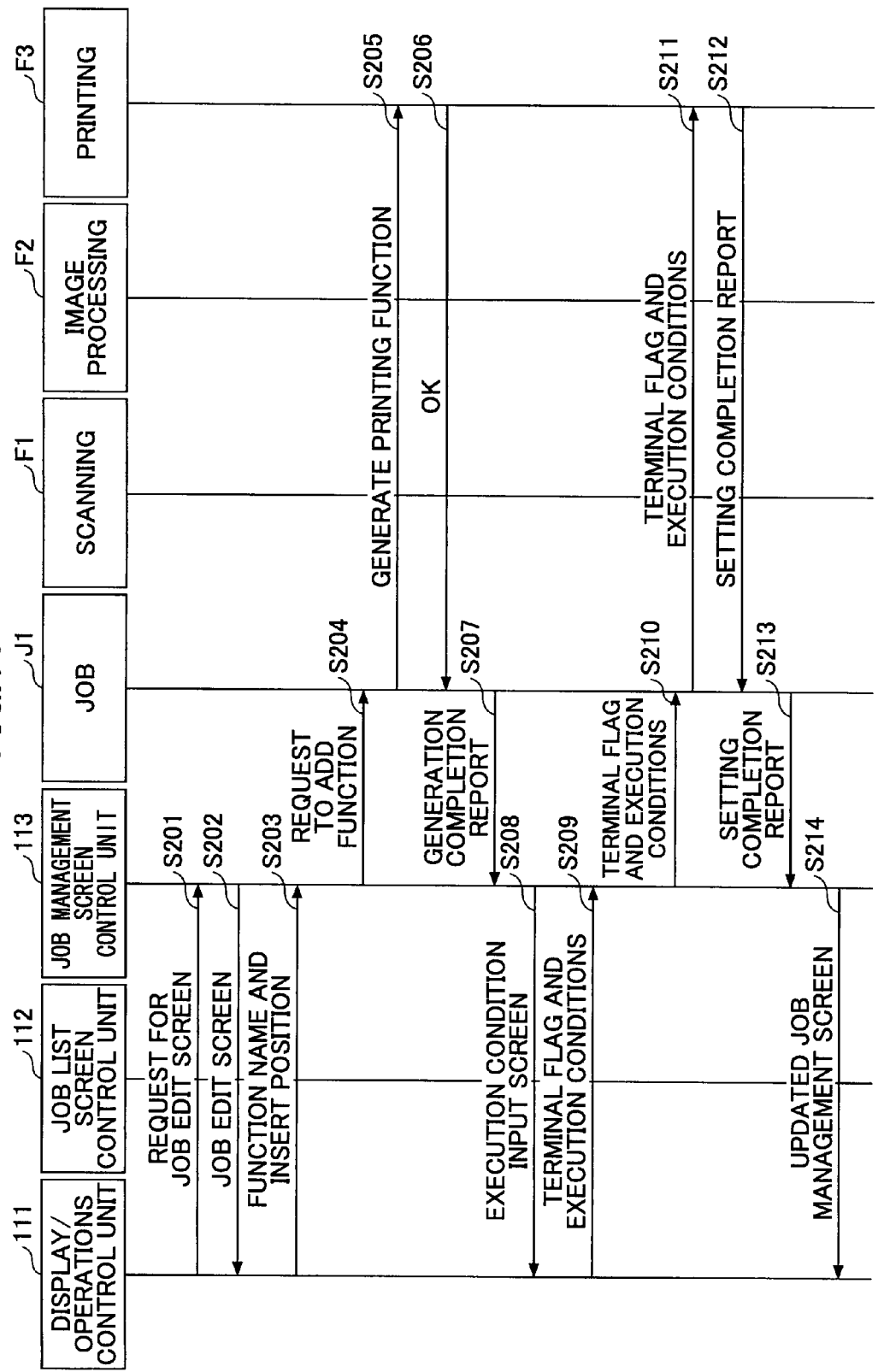

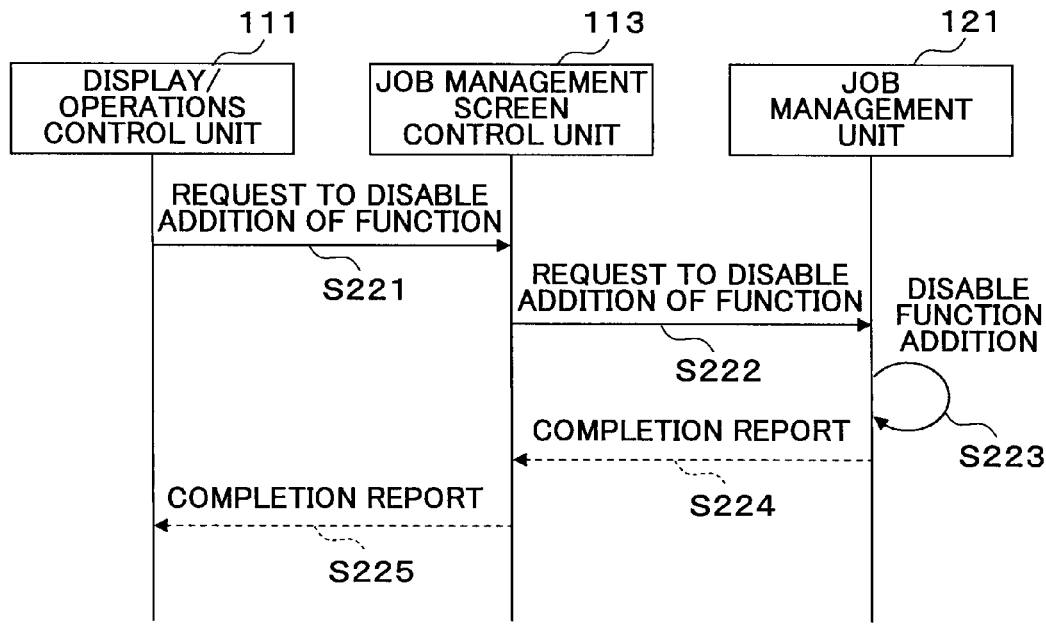
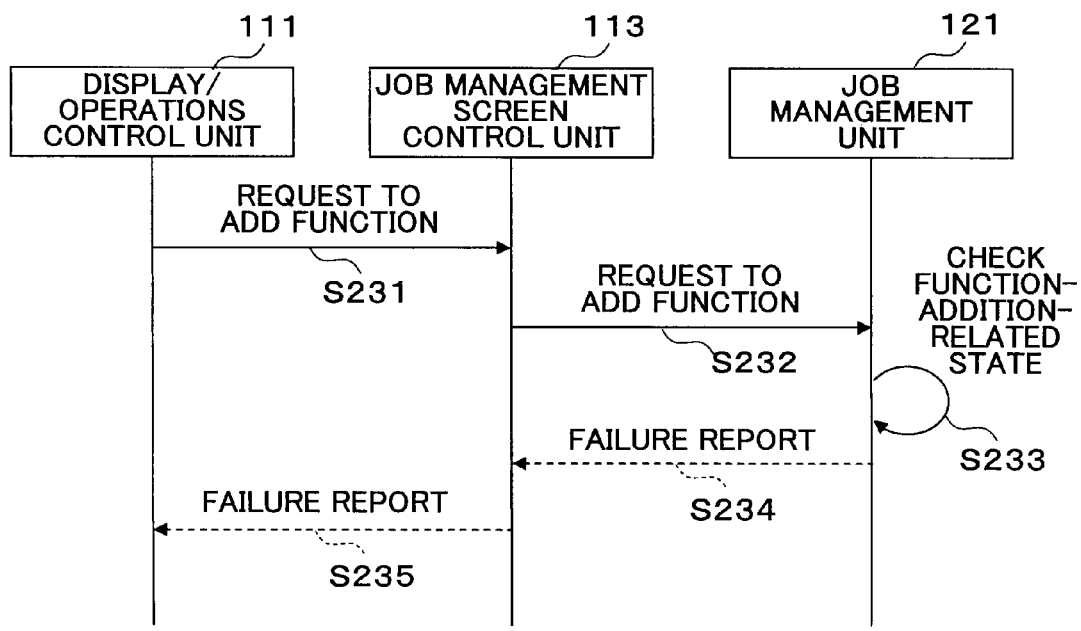

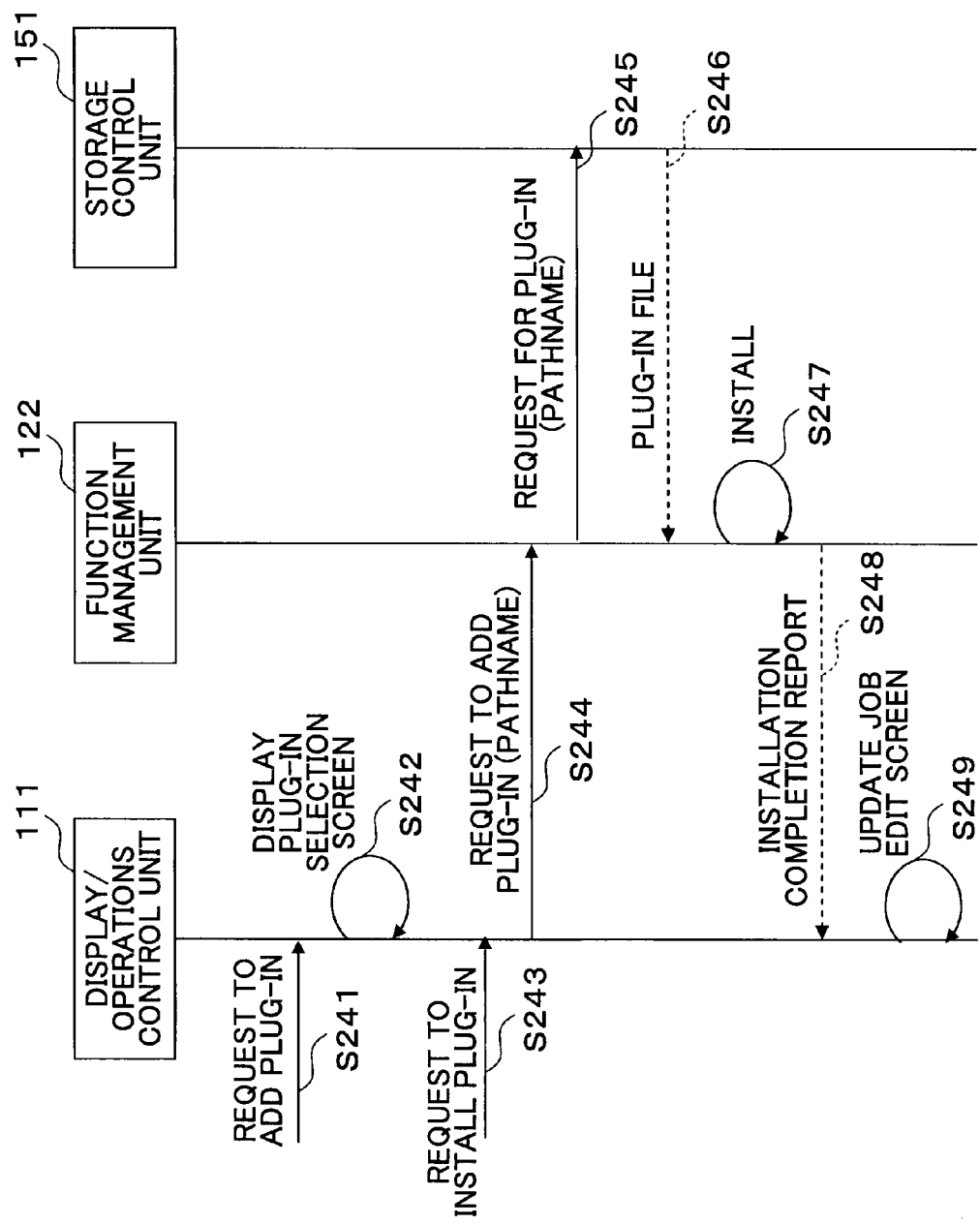

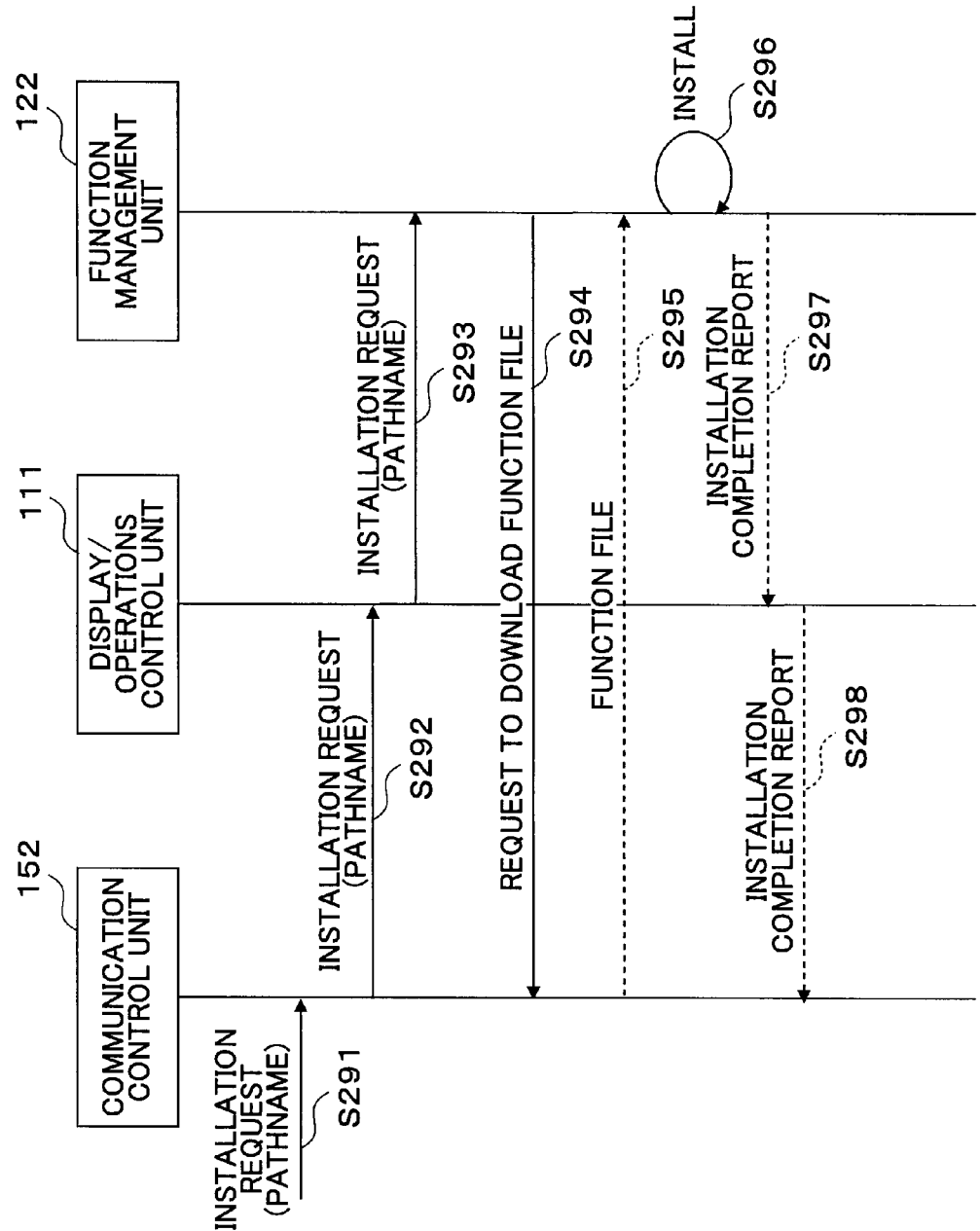

IMAGE PROCESSING APPARATUS, JOB MANAGEMENT METHOD, AND STORAGE MEDIUM

BACKGROUND OF THE INVENTION

1. Field of the Invention

The present invention generally relates to an image processing apparatus such as a multifunction printer (MFP).

2. Description of the Related Art

In conventional multifunction printers, software components are categorized into an application layer including applications, such as a copy application, a fax application, and a scanning application, representing jobs to be performed, and a service layer including services representing functions of the printer. Each application in the application layer performs its job by using a combination of services in the service layer. With this configuration, a combination of services or functions constituting an application is fixed and is not changeable in the middle of the execution of the application (after the execution of the application is started).

FIGS. 1A through 1C show exemplary jobs in a conventional image processing apparatus. FIG. 1A shows a copy job composed of a scanning function, an image processing function (e.g. N-up processing or resizing), and a printing function. FIG. 1B shows a fax job composed of a scanning function, an image processing function, and a fax transmission function. FIG. 1C shows a document storing job composed of a scanning function and a storage function. In the conventional image processing apparatus, the combination and execution sequence of functions constituting a job is statically fixed at the time when execution of the job is requested by a user (when the user presses the start button). In other words, a terminal function (a function executed at the end of a job) in a job is fixed and the configuration of the job is not changeable in the middle of the execution.

Also, in such a conventional image processing apparatus, adding a new function involves modification of other related components and therefore generates a heavy workload and requires much time.

Meanwhile, patent document 1 discloses a technology for efficiently managing different types of user requests in a uniform manner. In the disclosed technology, job execution requests from users are managed using a tree structure of "requests" and "request specifications".

[Patent document 1] Japanese Patent Application Publication No. 2006-59199

A "request" in patent document 1 is a concept corresponding to a "job" in the conventional image processing apparatus described above. The content of a "request" is fixed at the time when the "request" is made by a user and is not changeable in the middle of the execution.

SUMMARY OF THE INVENTION

Embodiments of the present invention provide an image processing apparatus, a job management method, and a storage medium containing program code for causing a computer to perform the job management method that solve or reduce one or more problems caused by the limitations and disadvantages of the related art.

An embodiment of the present invention provides an image processing apparatus where a job is implemented by one or more constituent functions. The image processing apparatus includes a control unit configured to display states of the job and the constituent functions, to allow a user to select one of the constituent functions and add a subsequent function after the selected one of the constituent functions, and to receive a request to execute the job.

Another embodiment of the present invention provides a job management method in an image processing apparatus where a job is implemented by one or more constituent functions. The job management method includes the steps of displaying states of the job and the constituent functions; allowing a user to select one of the constituent functions and add a subsequent function after the selected one of the constituent functions; and receiving a request to execute the job.

Still another embodiment of the present invention provides a storage medium having program code stored therein for causing a computer to function as a control unit of an image processing apparatus in which a job is implemented by one or more constituent functions, wherein the control unit is configured to display states of the job and the constituent functions, to allow a user to select one of the constituent functions and add a subsequent function after the selected one of the constituent functions, and to receive a request to execute the job.

BRIEF DESCRIPTION OF THE DRAWINGS

FIG. 3 is a drawing illustrating an exemplary software architecture of an image processing apparatus according to an embodiment of the present invention;

FIG. 11 is a sequence chart showing an exemplary process of adding a function to a job;

FIG. 15A is a sequence chart showing an exemplary process of disabling addition of functions to a job;

FIG. 15B is a sequence chart showing an exemplary process of adding a function to a job;

FIG. 17 is a sequence chart showing an exemplary process of installing a new function from a storage medium such as a memory card or an HDD;

FIG. 21 is a sequence chart showing an exemplary process of installing a new function from a PC;

DESCRIPTION OF THE PREFERRED EMBODIMENTS

Preferred embodiments of the present invention are described below with reference to the accompanying drawings.

<Job Configuration>

Figure 1A:
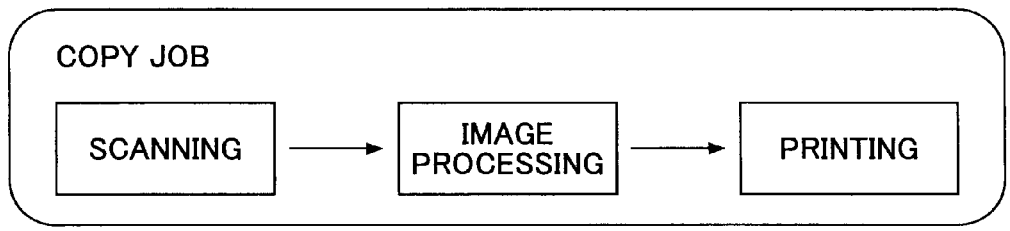
FIGS. 1A through 1C are drawings illustrating exemplary jobs in a conventional image processing apparatus.
Figure 1B:
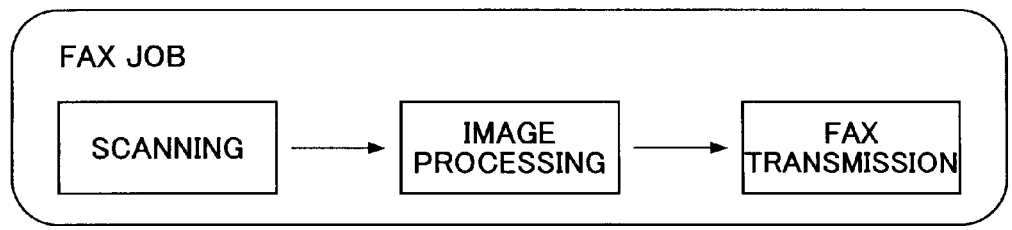
Figure 1C:
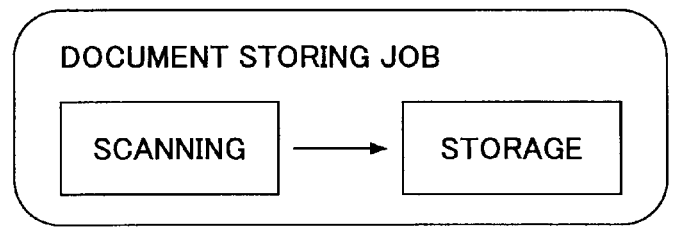
Figure 2A:
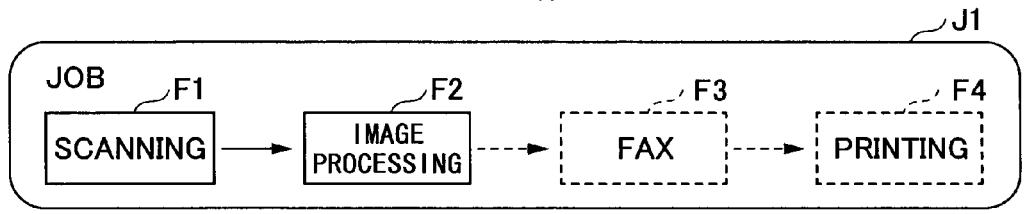
FIGS. 2A through 2C are drawings illustrating exemplary jobs in an image processing apparatus according to an embodiment of the present invention.
Figure 2B:
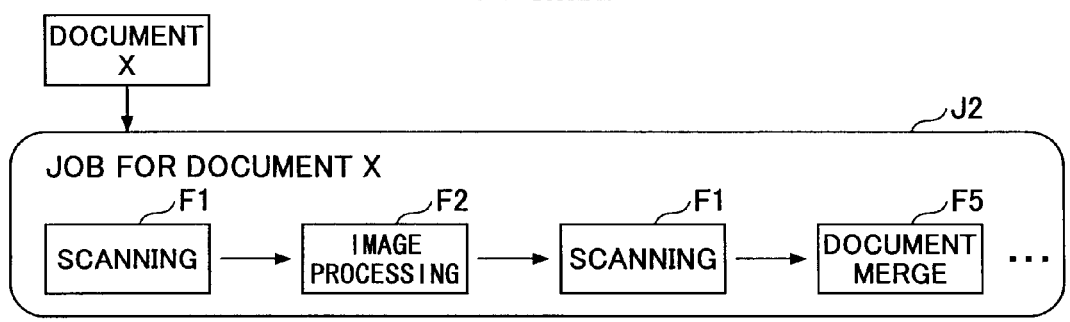
Figure 2C:
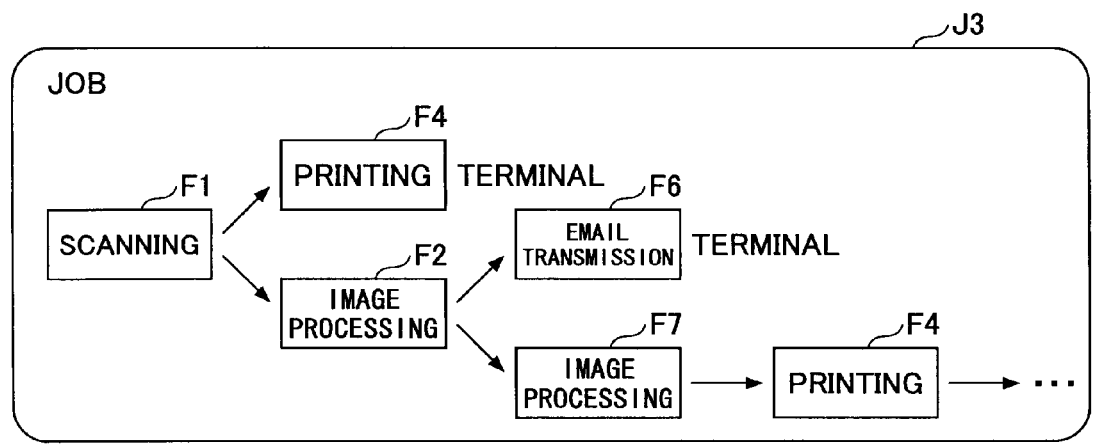

FIGS. 2A through 2C are drawings illustrating exemplary jobs in an image processing apparatus according to an embodiment of the present invention.

In FIG. 2A, a job J1 originally includes a scanning function F1 and an image processing function F2. A fax function F3 and a printing function F4 are to be added to the job J1 by the user. After the functions F1 and F2 are executed, the job J1 is halted. However, since the image processing function F2 is not a terminal function, the job J1 can be resumed by adding subsequent functions (e.g. the fax function F3 and/or the printing function F4). Here, a terminal function indicates a function that is executed at the end of a job or a processing path (a branch) in a job.

Thus, according to an embodiment of the present invention, it is possible to execute a job with an incomplete configuration and to obtain desired results by adding subsequent functions to the job. This method makes it possible to flexibly perform a desired task.

In FIG. 2B, a job J2 includes the scanning function F1, the image processing function F2, the scanning function F1, and a document merge function F5, and is configured to manage a document X throughout its life cycle. In this case, an execution log of the job J2 may be used as a processing history of the document X.

In FIG. 2C, the processing path of a job J3 branches into two or more processing paths. In other words, functions are executed not only in series but also in parallel. More specifically, in the job J3, the processing path branches from the scanning function F1 to the printing function F4 and the image processing function F2, and further branches from the image processing function F2 to an email transmission function F6 and an image processing function F7 that is followed by the printing function F4. A job may also be configured such that two or more processing paths converge into one processing path (i.e. outputs from multiple functions are combined and input to a single function). Further, a job may include conditional branches where a processing path branches if a certain condition is met.

<System Configuration>

FIG. 3 is a drawing illustrating an exemplary software architecture of an image processing apparatus according to an embodiment of the present invention.

As shown in FIG. 3, the exemplary image processing apparatus of this embodiment includes a user interface (UI) layer 11 that provides local and remote user interfaces (e.g. on a operations panel of the exemplary image processing apparatus or on a personal computer connected via a network to the exemplary image processing apparatus); a system layer 12 for managing jobs and functions; a job layer 13 including jobs (J1, J2, ... ); a function layer 14 including functions (F1, F2, F3, F4 ... ); and a device layer 15 for controlling hardware components.

The UI layer 11 includes a display/operations control unit 111 for controlling information display and handling user inputs, a job list screen control unit 112 for controlling job list screens, and a job management screen control unit 113 for controlling job management screens. In the present application, the display/operations control unit 111, the job list screen control unit 112, and the job management screen control unit 113 may be collectively called a control unit. The system layer 12 includes a job management unit 121 for managing jobs and a function management unit 122 for managing functions. The function management unit 122 also controls a process of installing a new function. The device layer 15 includes a storage control unit 151 for controlling storage devices such as a memory and a hard disk drive (HDD) and a communication control unit 152 for controlling a network device.

Figure 4:
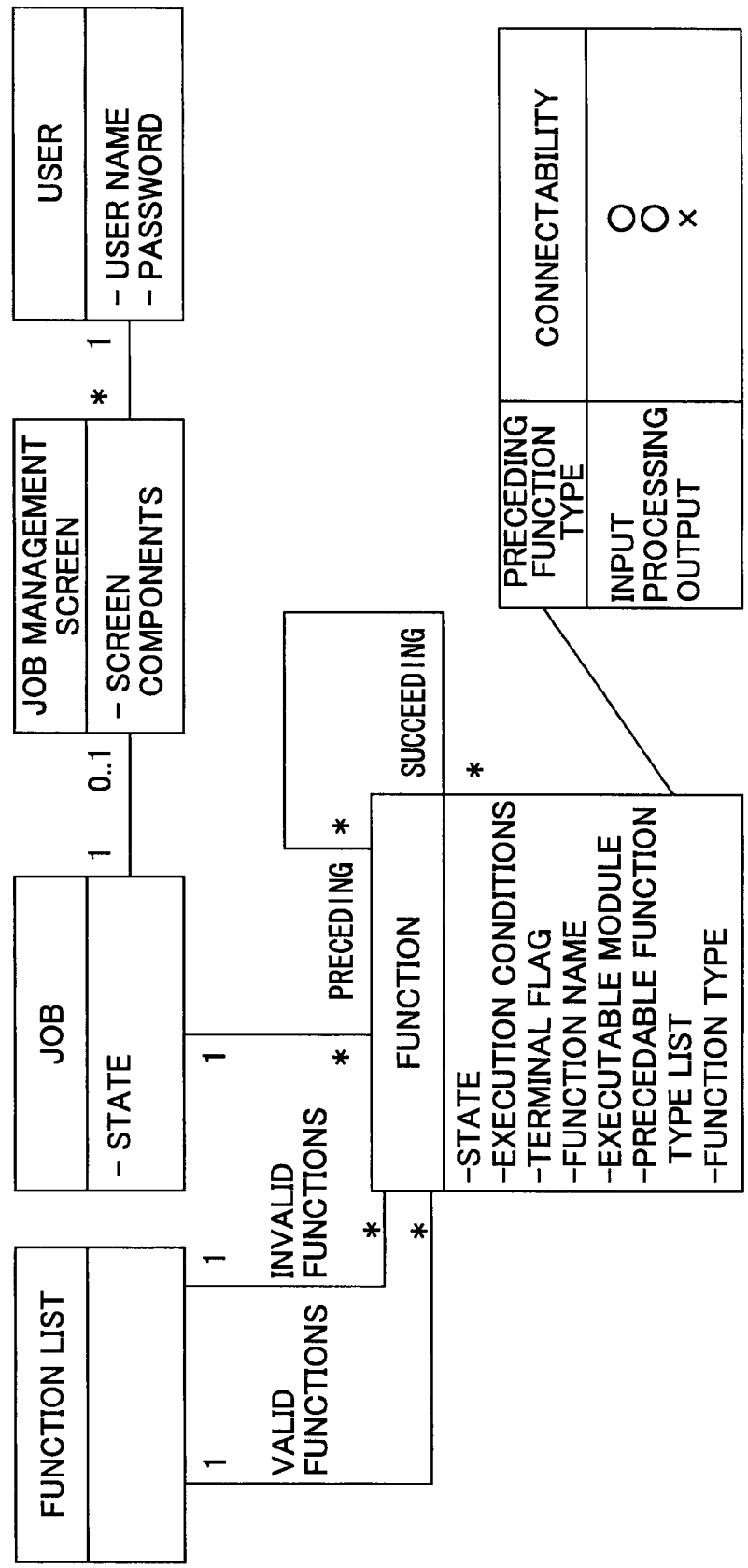
FIG. 4 is a drawing illustrating exemplary data structures.

FIG. 4 is a drawing illustrating exemplary data structures. A job includes an attribute indicating the state (status) of the job. A function includes attributes such as the state of the function, execution conditions, a terminal flag (indicating whether the function is a terminal function), a function name, an executable module name, a precedable function type list, and the type of the function (e.g. input function, processing function, or output function). A job management screen includes attributes indicating components of the screen. A user (information) includes a user name and a password. A job is linked to one or more functions and a job management screen. A function is linked to other functions to be executed before or after the function. A job management screen is linked to a user. A function list is linked to valid functions and invalid functions. The precedable function type list is used to determine whether the function can be connected to a preceding function. As shown in FIG. 4, the precedable function type list includes types of preceding functions and the connectability of the function for each of the types. In this example, the function is connectable to a preceding input function or processing function but not to a preceding output function. Alternatively, the connectability of a function may be determined based on the compatibility with the actual task of a preceding function instead of on the function type.

Figure 5:
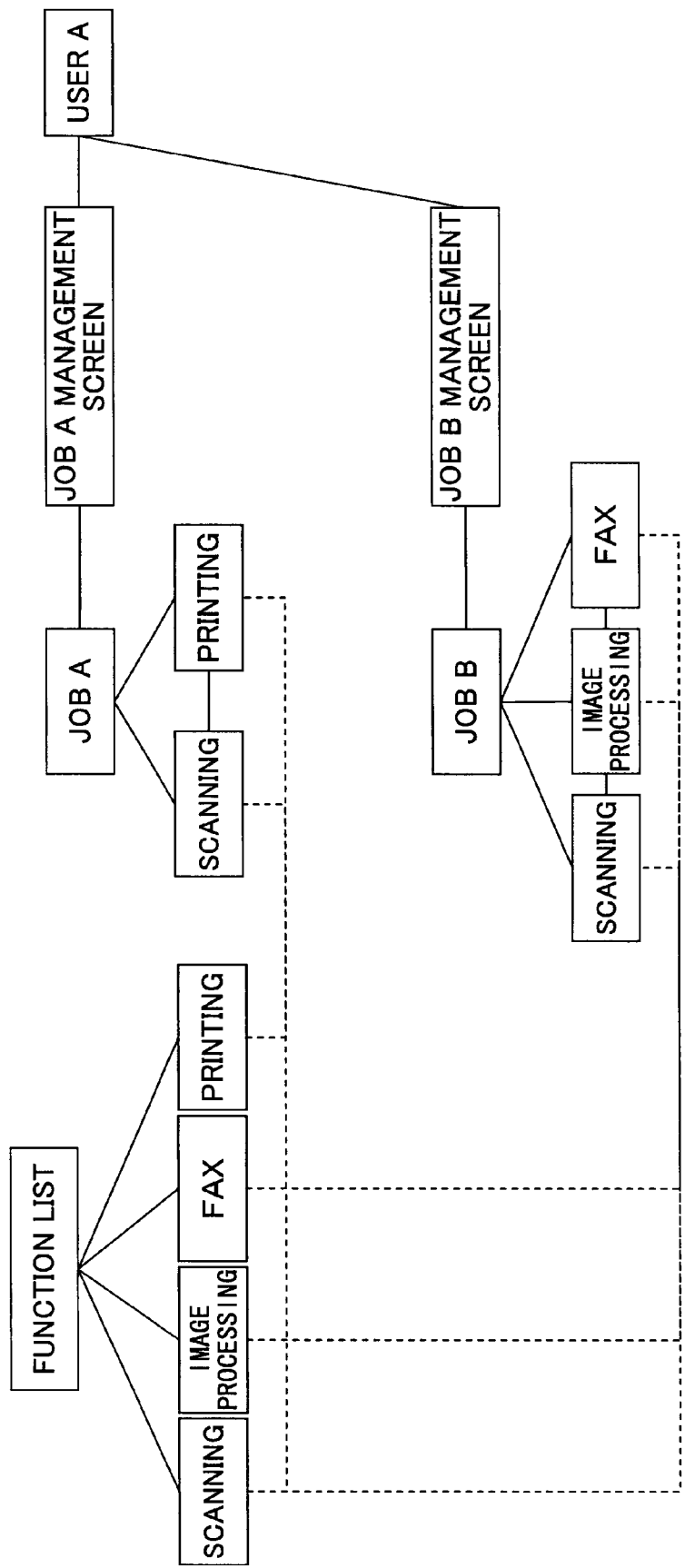
FIG. 5 is a drawing illustrating an exemplary relational structure.

FIG. 5 is a drawing illustrating an exemplary relational structure. In this example, a function list is linked to valid functions including a scanning function, an image processing function, a fax (transmission) function, and a printing function. User A is linked to a job J1 management screen linked to a job J1, and a job B management screen linked to a job B. The job J1 is linked to the scanning function and the printing function. The job B is linked to the scanning function, the image processing function, and the fax function. The functions linked to the jobs A and B correspond to the valid functions linked to the function list. Functions not linked to the function list do not appear under the jobs.

Figure 6B:
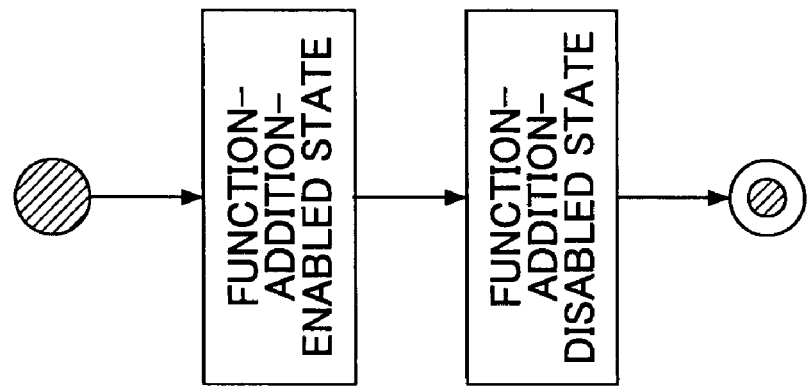
FIGS. 6A and 6B are drawings illustrating states of a job.
Figure 6A:
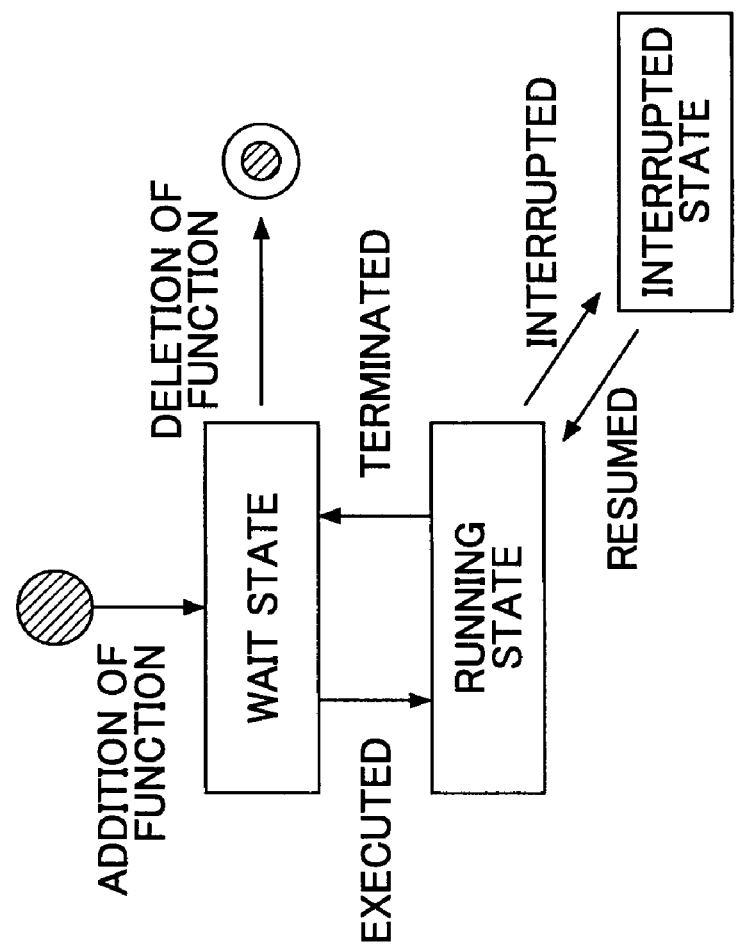

FIGS. 6A and 6B are drawings illustrating states of a job. FIG. 6A shows execution states of a job and FIG. 6B shows function-addition-related states of a job. As shown in FIG. 6A, a job is in one of the following execution states: a wait state ("waiting"), a running state ("running"), and an interrupted state ("interrupted"; a state where a job is interrupted due to an error). When a job is in the wait state, functions can be added to or removed from the job. When the job in the wait state is executed, it passes to the running state. When the job in the running state is halted, it passes to the wait state. When the job in the running state is interrupted, it passes to the interrupted state. When the job in the interrupted state is resumed, it passes to the running state.

As shown in FIG. 6B, a job is also in one of the following function-addition-related states: a function-addition-enabled state ("enabled") and a function-addition-disabled state ("disabled"). Alternatively, the exemplary image processing apparatus may be configured such that a job is always in a function-addition-enabled state until it is deleted. In this case, the function-addition-disabled state is not necessary. In this embodiment, the job management unit 121 disables addition of functions to a job if (1) All functions at the ends of processing paths (or branches) in the job are specified as terminal functions.

(2) Addition of functions to the job is explicitly disabled by the user.

Figure 7:
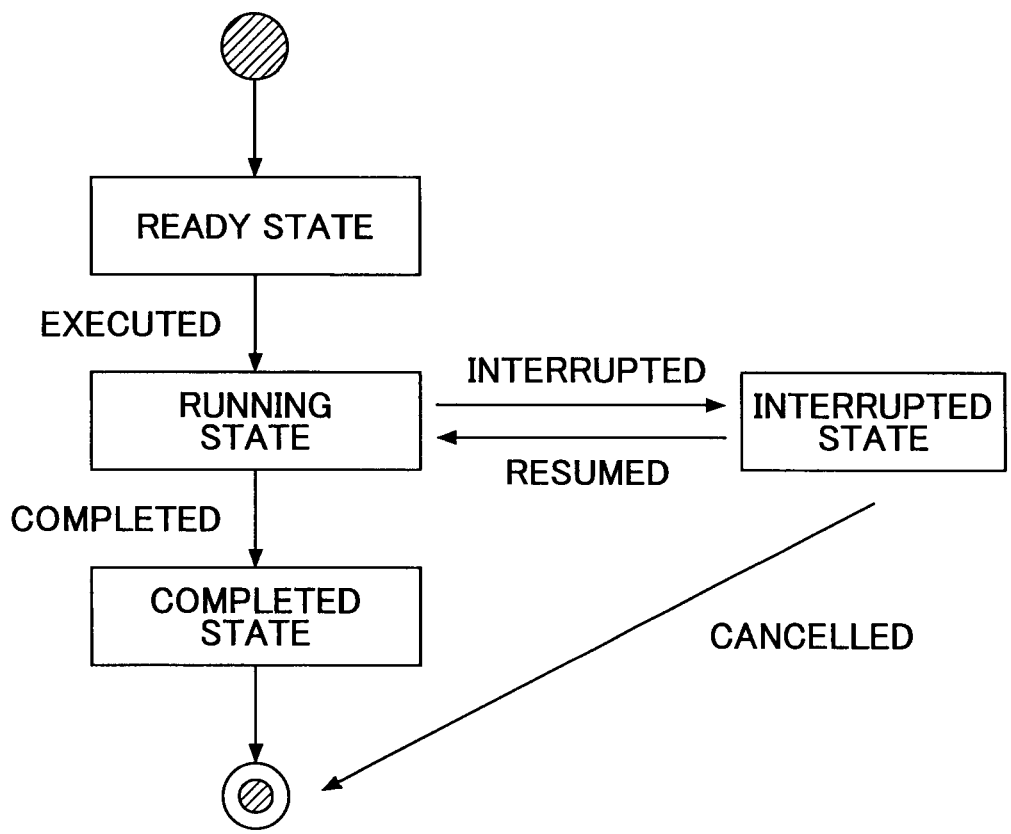
FIG. 7 is a drawing illustrating states of a function.

FIG. 7 is a drawing illustrating states of a function. As shown in FIG. 7, a function is in one of a ready state ("ready"), a running state ("running"), an interrupted state ("interrupted"; a state where a function is interrupted due to an error), and a completed state ("completed"). When a function in the ready state is executed, it passes to the running state. When the function in the running state is interrupted, it passes to the interrupted state. When the function in the interrupted state is resumed, it passes to the running state. When the function in the running state is completed, it passes to the completed state.

<Operation>

Figure 8:
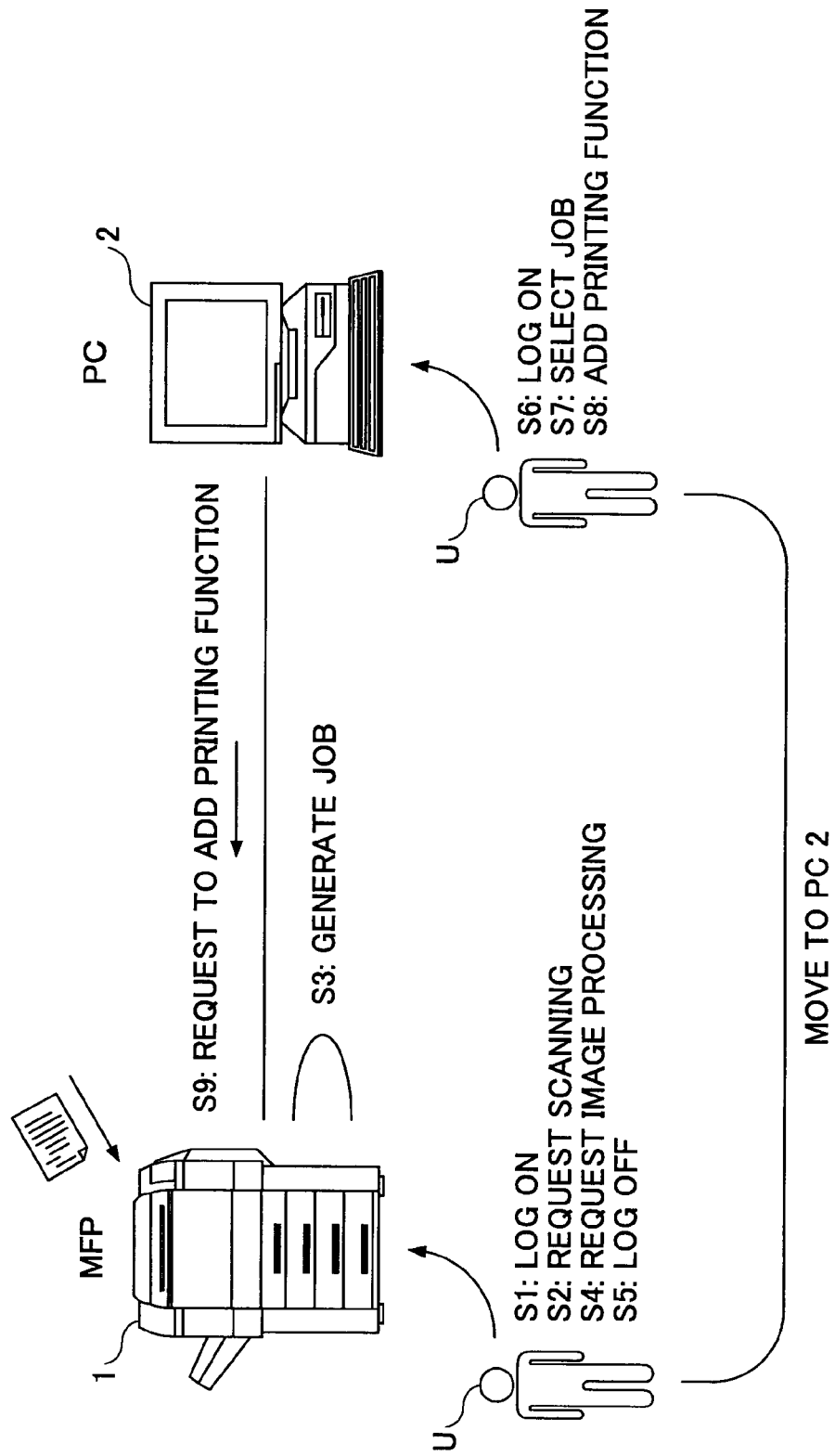
FIG. 8 is a drawing illustrating an exemplary process of adding a function to a job.

FIG. 8 is a drawing illustrating an exemplary process of adding a function to a job.

As shown in FIG. 8, when a user U logs on to an MFP 1 (step S1) and requests execution of a scanning function (step S2), the MFP 1 generates a job (step S3). Then, when the user U requests execution of an image processing function (step S4), the MFP 1 starts the job and executes the scanning and image processing functions. In this example, the user U requests the execution of the scanning and image processing functions separately in steps S2 and S4. Alternatively, the user U may specify the scanning function and the image processing function in a job in advance and request the execution of the job.

After step S4, the user U logs off from the MFP 1 (step S5), moves to a PC 2 and logs on to the MFP 1 from the PC 2 (steps S6), selects the unfinished job (step S7), and requests addition of a printing function to the job (step S8). The request is sent from the PC 2 to the MFP 1 (step S9), and the MFP 1 resumes the job and executes the printing function.

Figure 9:
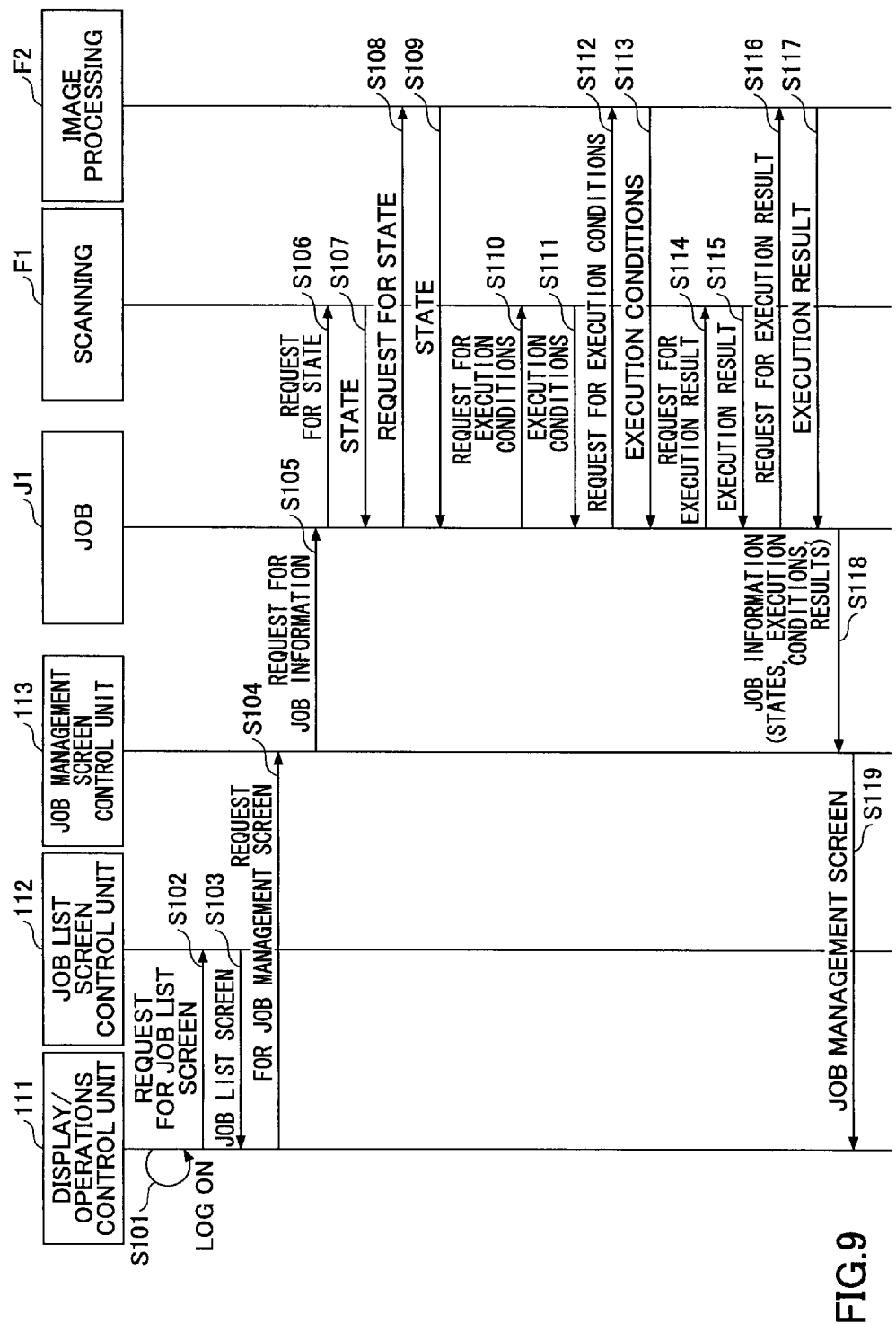
FIG. 9 is a sequence chart showing an exemplary process of displaying a job management screen.

FIG. 9 is a sequence chart showing an exemplary process of displaying a job management screen. In this exemplary process, it is assumed that a scanning function F1 and an image processing function F2 are specified in a job J1 in the order mentioned.

Figure 10A:
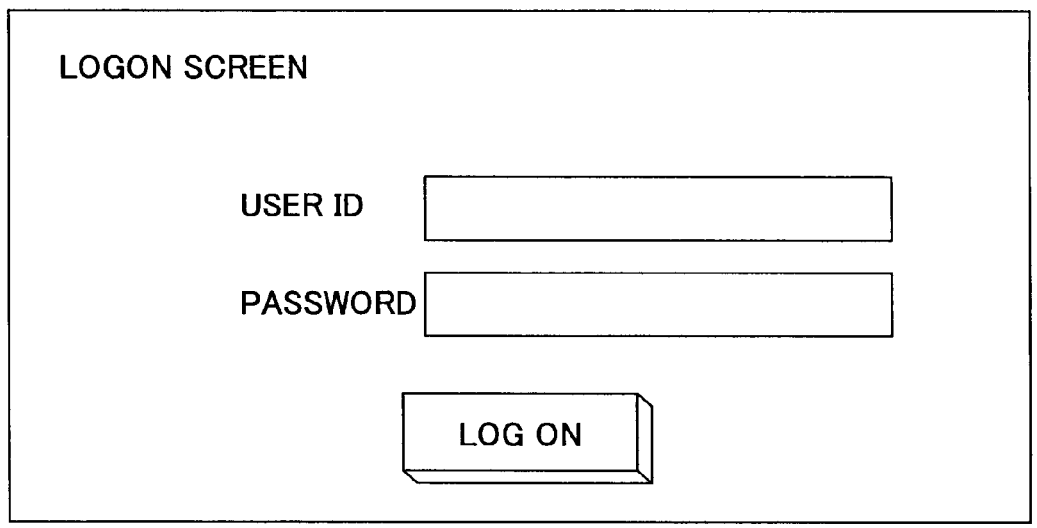
FIGS. 10A through 10D are drawings illustrating screens used in the exemplary process shown in FIG. 9.

In FIG. 9, the user logs on to the exemplary image processing apparatus via the display/operations control unit 111 to perform job management (step S101). FIG. 10A shows an exemplary logon screen. The user enters an user ID and a password on the logon screen and presses a Logon button to log on to the exemplary image processing apparatus.

Figure 10B:
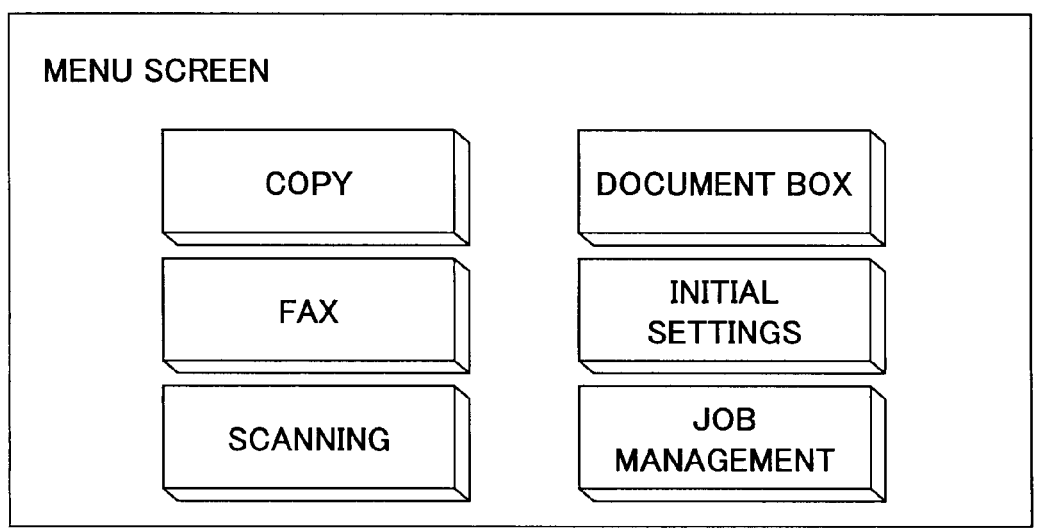
Figure 10C:
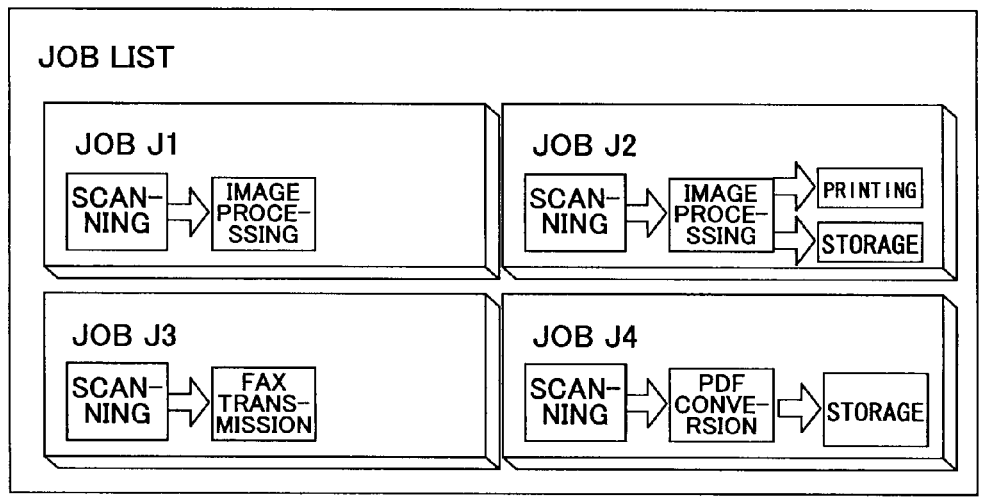

Referring back to FIG. 9, the display/operations control unit 111 requests the job list screen control unit 112 to send a job list screen (step S102). The job list screen control unit 112 generates a job list screen including a list of jobs the user is authorized to manipulate (e.g. jobs created by the user) and sends the job list screen to the display/operations control unit 111 (step S103). Then, the display/operations control unit 111 displays the job list screen. FIG. 10B shows an exemplary menu screen displayed just after the user logs on to the exemplary image processing apparatus. Pressing a Job Management button on the menu screen displays a job list screen as shown in FIG. 10C. The job list screen displays jobs that are currently in the wait state. On the job list screen, jobs are represented by thumbnail images of the corresponding job management screens (in the exemplary image processing apparatus, screen data are stored for each of the jobs).

When the user selects one of the jobs on the job list screen (e.g. job J1 shown in FIG. 10C), the display/operations control unit 111 requests the job management screen control unit 113 to send a job management screen for the job J1 (step S104). The job management screen control unit 113 requests the job J1 to send its job information (step S105). In the exemplary processes described below, the job management screen control unit 113 communicates directly with a job, and the job communicates directly with functions. Alternatively, the job management screen control unit 113 may be configured to obtain information on a job via the job management unit 121 and the job management unit 121 may be configured to obtain information on functions via the function management unit 122.

The job J1 (or the job management unit 121) requests the scanning function F1 to send its state (step S106), and the scanning function F1 returns its state to the job J1 (step S107). Similarly, the job J1 requests the image processing function F2 to send its state (step S108) and the image processing function F2 returns its state to the job J1 (step S109).

Next, the job J1 requests the scanning function F1 to send its execution conditions (step S110) and the scanning function F1 returns its execution conditions to the job J1 (step S111). Similarly, the job J1 requests the image processing function F2 to send its execution conditions (step S112) and the image processing function F2 returns its execution conditions to the job J1 (step S113).

Then, the job J1 requests the scanning function F1 to send its execution result (step S114) and the scanning function F1 returns its execution result to the job J1 (step S115). Similarly, the job J1 requests the image processing function F2 to send its execution result (step S116) and the image processing function F2 returns its execution result to the job J1 (step S117).

Figure 10D:
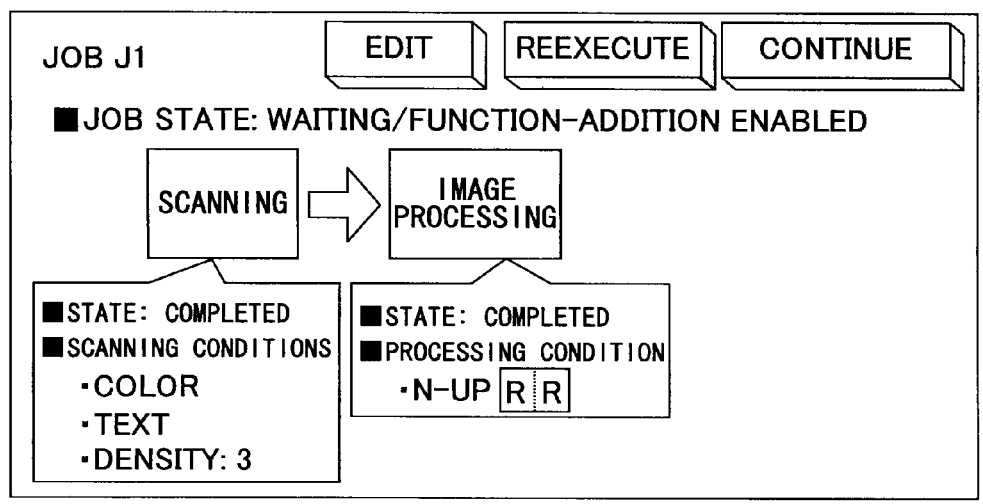

The job J1 sends the obtained states, execution conditions, and execution results to the job management screen control unit 113 (step S118). The job management screen control unit 113 generates a job management screen based on the states, execution conditions, and execution results sent from the job J1, and sends the job management screen to the display/operations control unit 111 (step S119). Then, the display/operations control unit 111 displays the job management screen. With the above configuration, it is possible to display the states of a job and its constituent functions only when the user is authorized to manipulate the job. FIG. 10D shows an exemplary job management screen displaying details of the job J1. In the example shown in FIG. 10D, the state of the scanning function is "completed"; the execution conditions of the scanning function are "color", "text", and "density: 3; the state of the image processing function is "completed"; and the execution condition of the image processing function is "N-up processing".

FIG. 11 is a sequence chart showing an exemplary process of adding a function to a job. In this exemplary process, it is assumed that a scanning function F1 and an image processing function F2 are specified in a job J1 in the order mentioned, and a printing function F3 is to be added to the job J1.

When an Edit button is pressed on the job management screen shown in FIG. 10D, the display/operations control unit 111 requests the job management screen control unit 113 to send a job edit screen (step S201) as shown in FIG. 11.

Figure 12A:
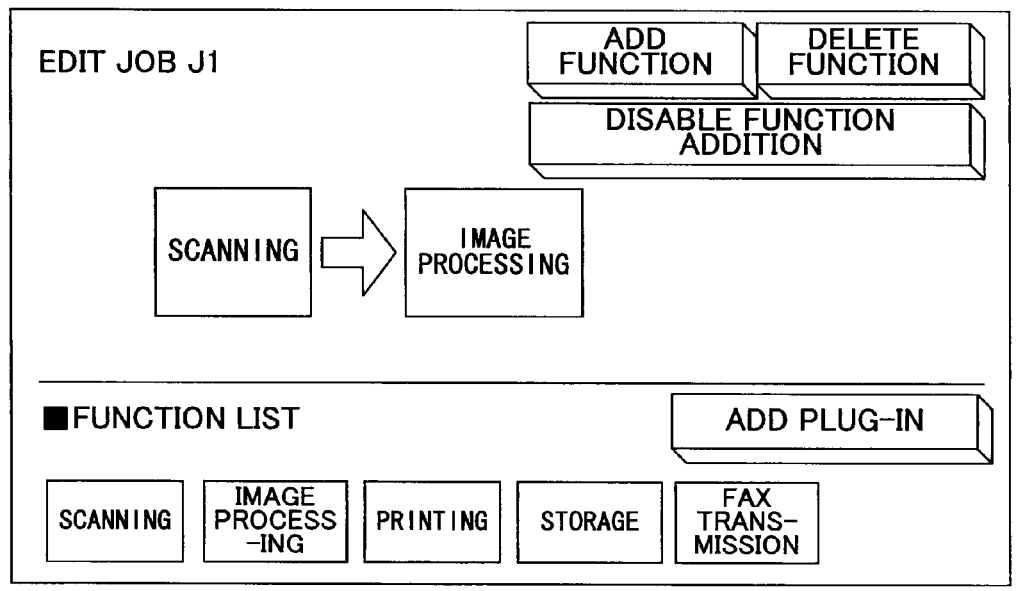
FIGS. 12A through 12E are drawings illustrating exemplary screens used in the exemplary process shown in FIG. 11.

The job management screen control unit 113 sends the job edit screen to the display/operations control unit 111 (step S202), and the display/operations control unit 111 displays the job edit screen. FIG. 12A shows an exemplary job edit screen. On the exemplary job edit screen, the user can select a function from a selectable function list shown in the lower part of the screen and add the selected function to the job J1.

Figure 12B:
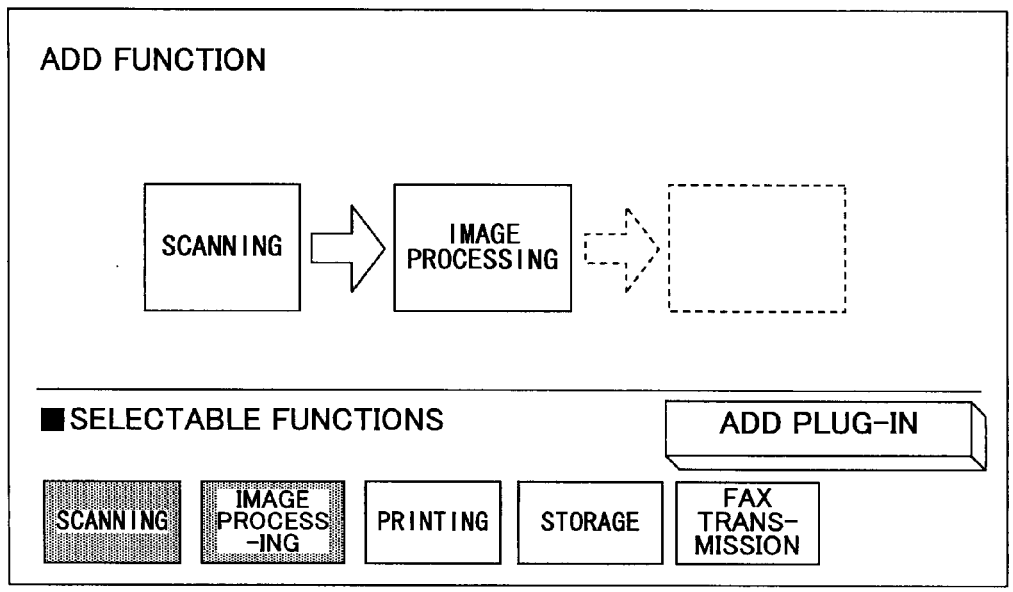
Figure 12C:
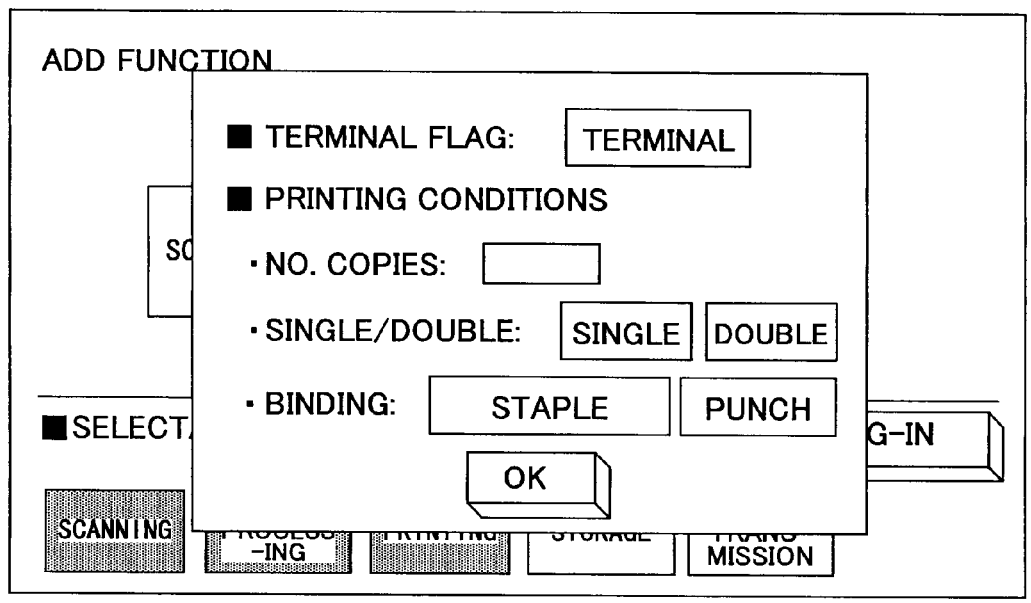
Figure 12D:
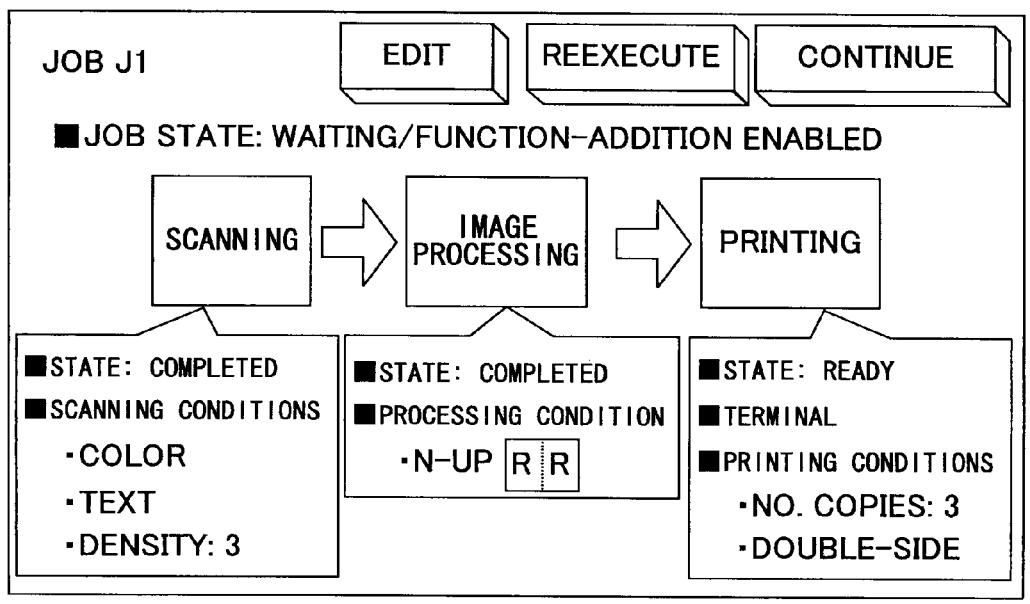
Figure 12E:
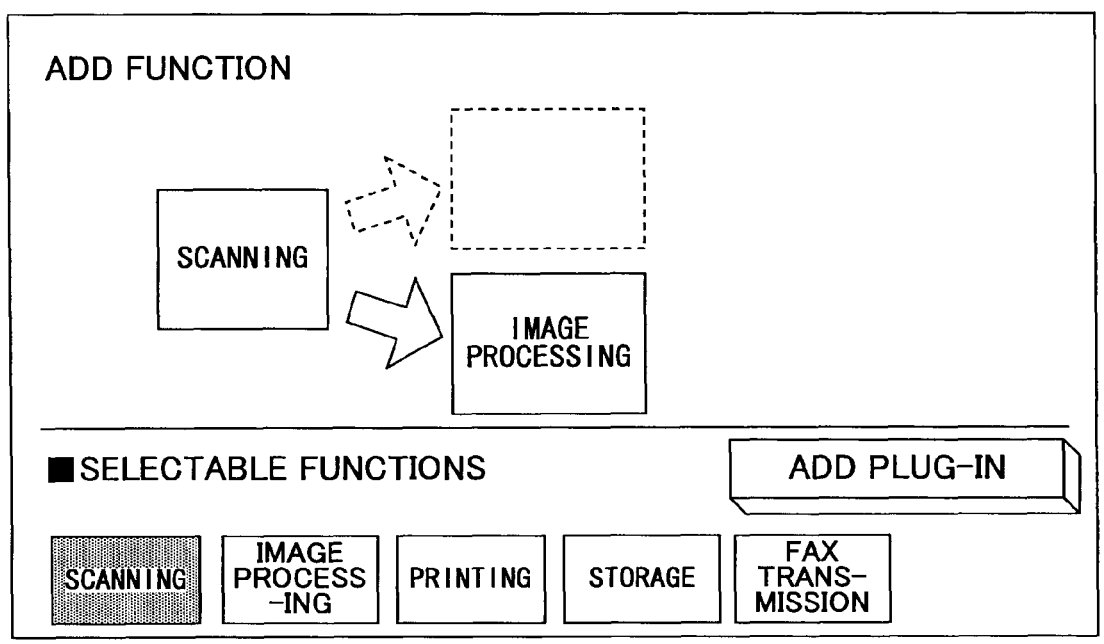

Referring back to FIG. 11, when the user selects a function to be added to the job J1 on the job edit screen, the display/operations control unit 111 sends information, including the name of the selected function and an insert position where the selected function is to be inserted, to the job management screen control unit 113 (step S203). The job management screen control unit 113 requests the job J1 (or the job management unit 121) to add the selected function based on the information sent from the display/operations control unit 111 (step S204). For example, when the user selects the image processing function as a preceding function and presses an Add Function button on the job edit screen shown in FIG. 12A, an add function screen is displayed as shown in FIG. 12B. In this step, if the preceding function is a terminal function, the job management screen control unit 113 rejects addition of a function. On the add function screen, a blank rectangle (shown by a dotted line) indicating an insert position where an additional function is to be inserted is shown after the image processing function. Selecting the printing function from a selectable function list on the add function screen inserts the printing function into the insert position. The selectable function list shows functions (selectable functions) that can be connected to a preceding function (in this example, the image processing function). The function management unit 122 determines whether each of installed functions is selectable based on the types of a preceding function and the installed functions and provides a list of selectable functions to the job management screen control unit 113. Alternatively, the function management unit 122 may be configured to determine whether to allow addition of a function when it is requested. On the other hand, if the user selects the scanning function as a preceding function and presses the Add Function button on the job edit screen shown in FIG. 12A, a blank rectangle or an insert position is displayed as shown in FIG. 12E after the scanning function in parallel with the image processing function (the processing path of the job J1 branches into two processing paths).

In FIG. 11, assuming that the printing function F3 is selected as a function to be added, the job J1 generates an instance of the printing function F3 (steps S205 and S206). If the instance is successfully generated, the job J1 sends a generation completion report to the job management screen control unit 113 (step S207). When receiving the generation completion report, the job management screen control unit 113 sends an execution condition input screen to the display/operations control unit 111 (step S208). FIG. 12C shows an exemplary execution condition input screen for the printing function. The exemplary execution condition input screen allows the user to specify the terminal flag (indicating whether the function is a terminal function) and printing conditions such as the number of copies, single/double side printing, and the binding method.

When the user specifies the terminal flag and enters execution conditions on the execution condition input screen, the display/operations control unit 111 sends the terminal flag and the execution conditions to the job management screen control unit 113 (step S209). The job management screen control unit 113 sends the terminal flag and the execution conditions to the job J1 (step S210), and the job J1 sends them to (the instance of) the printing function F3 (step S211).

The printing function F3 sets the execution conditions and sends a setting completion report to the job J1 (step S212). The job J1 sends the setting completion report to the job management screen control unit 113 (step S213). Then, the job management screen control unit 113 sends an updated job management screen including the added printing function and its execution conditions to the display/operations control unit 111 (step S214). FIG. 12D shows an example of the updated job management screen. On the updated job management screen, the printing function is added after the image processing function, and the state (ready), a terminal flag (terminal), and execution conditions (the number of copies: 3, double-side printing) of the printing function are displayed.

Next, exemplary methods of disabling or enabling addition of functions to a job are described.

Figure 13:
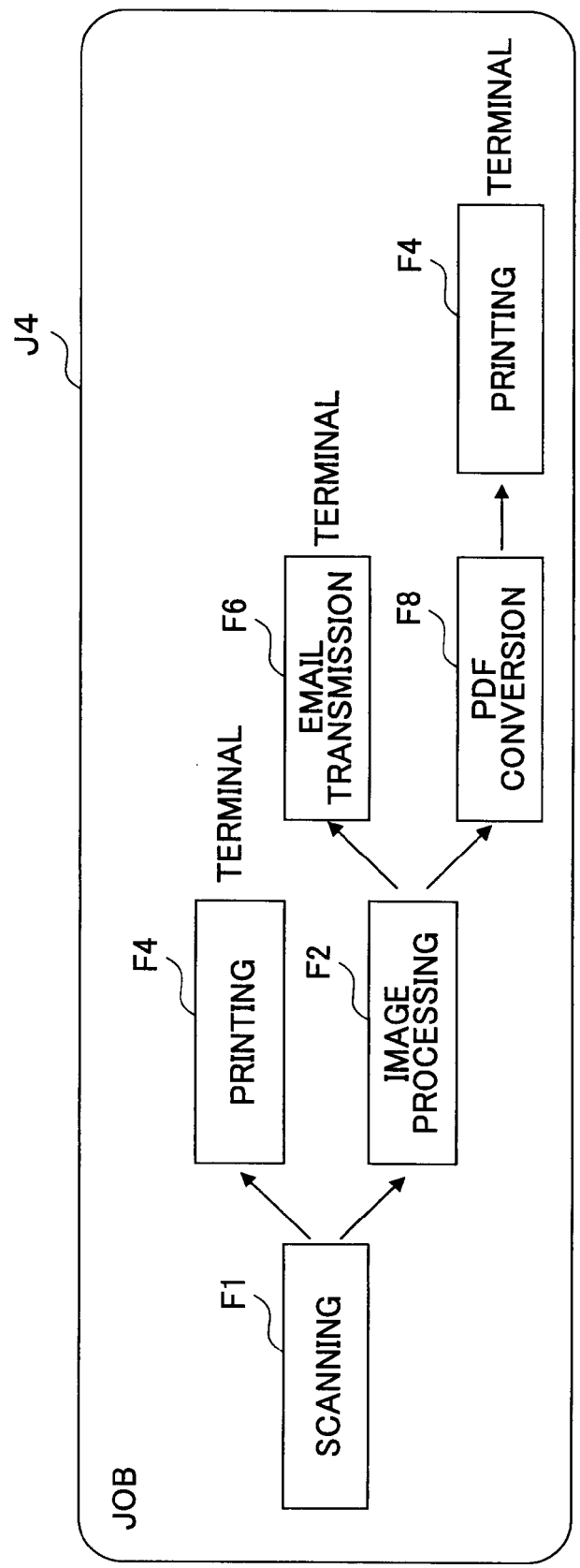
FIG. 13 is a drawing illustrating an exemplary job where all functions at the ends of processing paths are specified as terminal functions.

FIG. 13 is a drawing illustrating an exemplary job where all functions at the ends of processing paths are specified as terminal functions. In a job J4 shown in FIG. 13, a printing function F4 branching from a scanning function F1 at the top of the job is specified as a terminal function; an email transmission function F6 branching from an image processing function F2 branching from the scanning function F1 is specified as a terminal function; and a printing function F4 following a PDF conversion function F8 branching from the image processing function F2 is also specified as a terminal function. In this case, the job management unit 121 puts the job J4 in the function-addition-disabled state. Even in this case, however, adding a function branching from a non-terminal function (such as F1, F2, and F8) may be allowed.

Figure 14A:
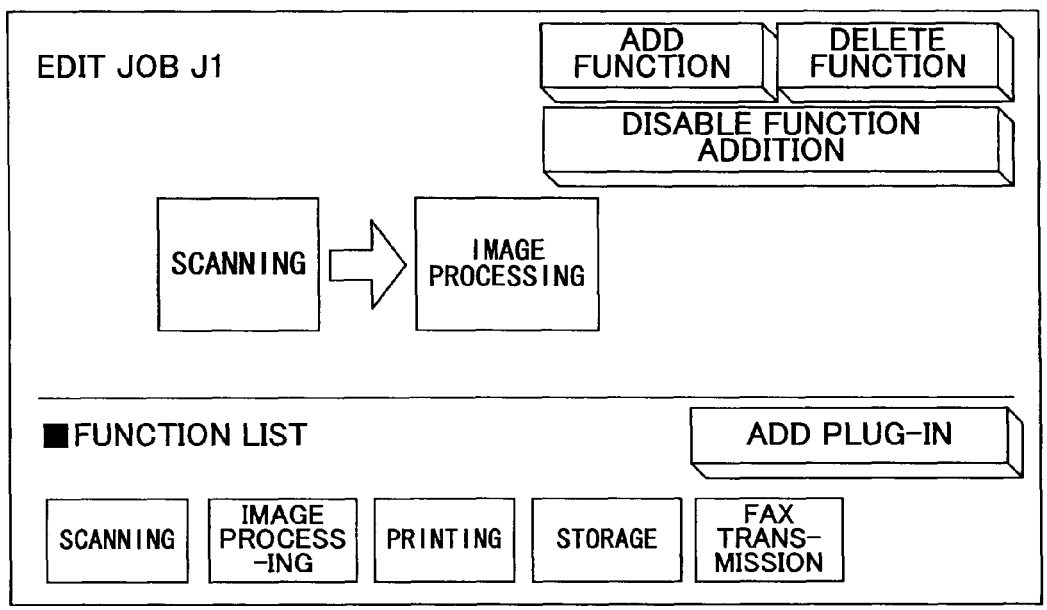
FIGS. 14A and 14B are drawings illustrating exemplary screens used in a process of explicitly disabling addition of functions to a job.
Figure 14B:
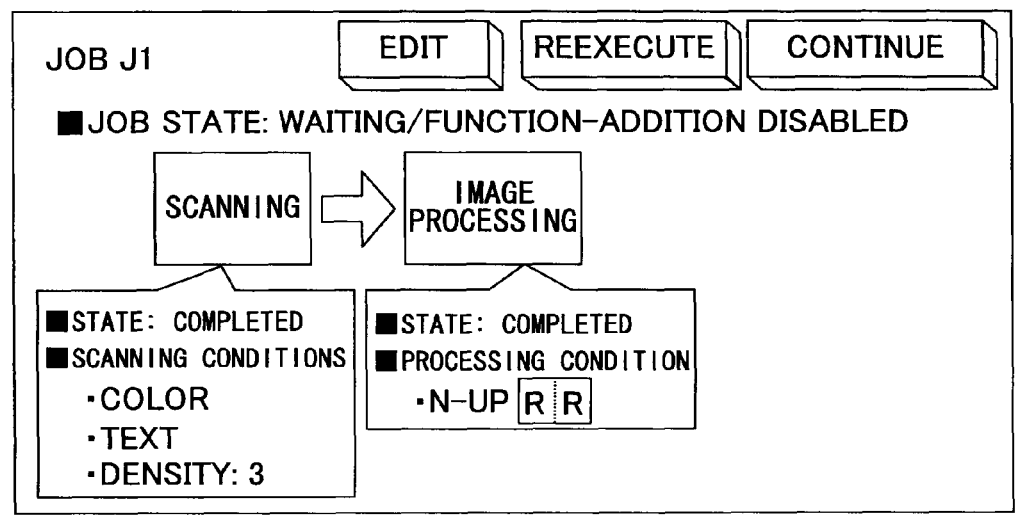

FIGS. 14A and 14B are drawings illustrating exemplary screens used in a process of explicitly disabling addition of functions to a job. FIG. 14A shows a job edit screen for editing a job J1. Pressing a Disable Function Addition button puts the job J1 in the function-addition-disabled state and displays an updated job management screen as shown in FIG. 14B.

FIG. 15A is a sequence chart showing an exemplary process of disabling addition of functions to a job. FIG. 15B is a sequence chart showing an exemplary process of adding a function to a job.

FIG. 15A shows an exemplary process performed when a user presses the Disable Function Addition button. The display/operations control unit 111 requests the job management screen control unit 113 to disable addition of functions to a specified job (step S221). The job management screen control unit 113 requests the job management unit 121 to disable addition of functions to the job (step S222).

When requested, the job management unit 121 disables addition of functions to the job (puts the job in the function-addition-disabled state) (step S223) and sends a completion report to the job management screen control unit 113 (step S224). The job management screen control unit 113 sends the completion report to the display/operations control unit 111 (step S225).

FIG. 15B shows an exemplary process of adding a function to a job. The display/operations control unit 111 requests the job management screen control unit 113 to add a selected function to a specified job (step S231). The job management screen control unit 113 requests the job management unit 121 to add the selected function to the job (step S232).

When requested, the job management unit 121 checks the function-addition-related state of the job (step S233). If the job is in the function-addition-disabled state, the job management unit 121 sends a failure report to the job management screen control unit 113 (rejects addition of the selected function) (step S234). The job management screen control unit 113 sends the failure report to the display/operations control unit 111 (step S235).

Next, methods for installing new functions (plug-in functions) are described.

Figure 16A:
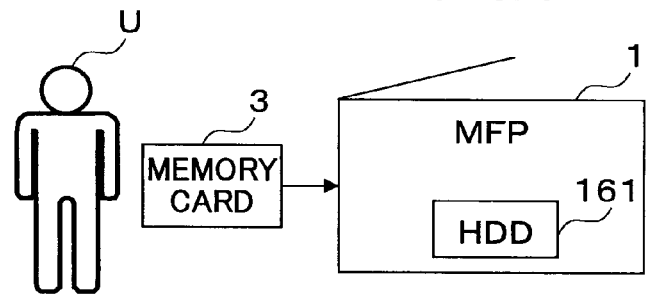
FIGS. 16A through 16C are drawings showing exemplary methods for installing new functions.
Figure 16B:
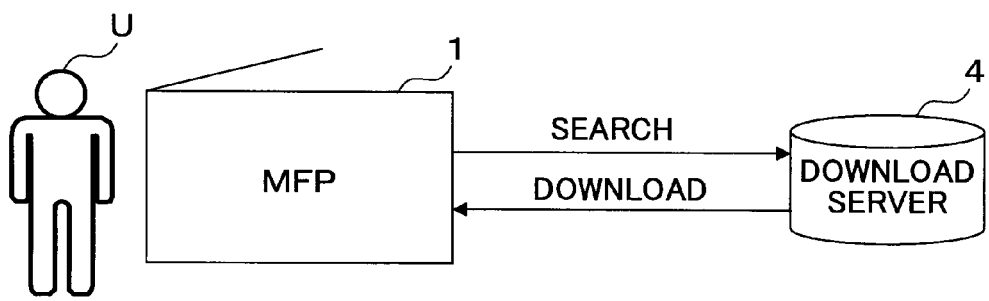
Figure 16C:
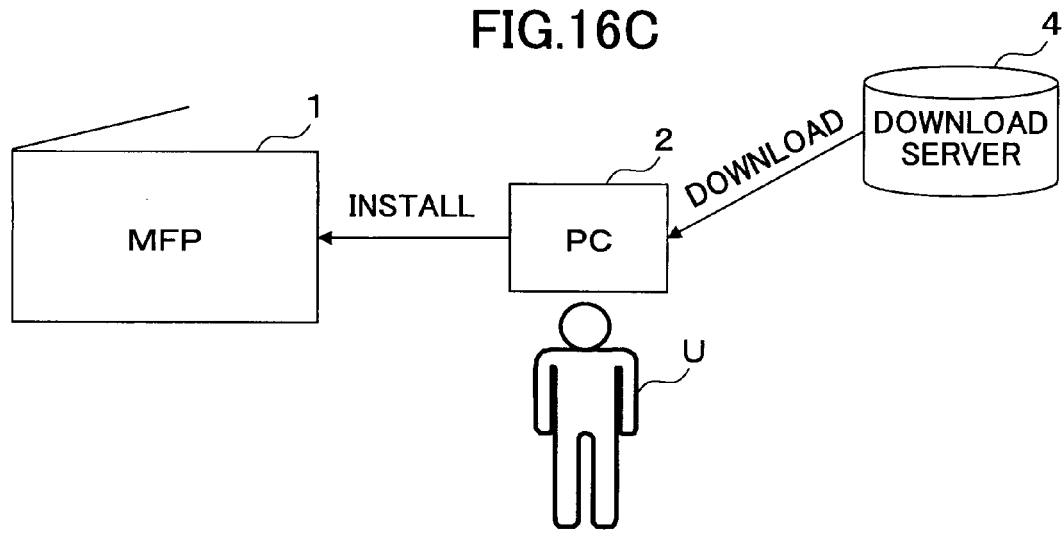

FIGS. 16A through 16C are drawings showing exemplary methods for installing new functions. In an example shown in FIG. 16A, a function is installed from a memory card 3 or an HDD 161 of the MFP 1. In another example shown in FIG. 16B, the MFP 1 searches for available functions on a download server 4 and downloads found functions. In still another example shown in FIG. 16C, a function is downloaded from the download server 4 to a PC 2 and then installed into the MFP 1.

FIG. 17 is a sequence chart showing an exemplary process of installing a new function from a storage medium such as a memory card or an HDD.

Figure 18A:
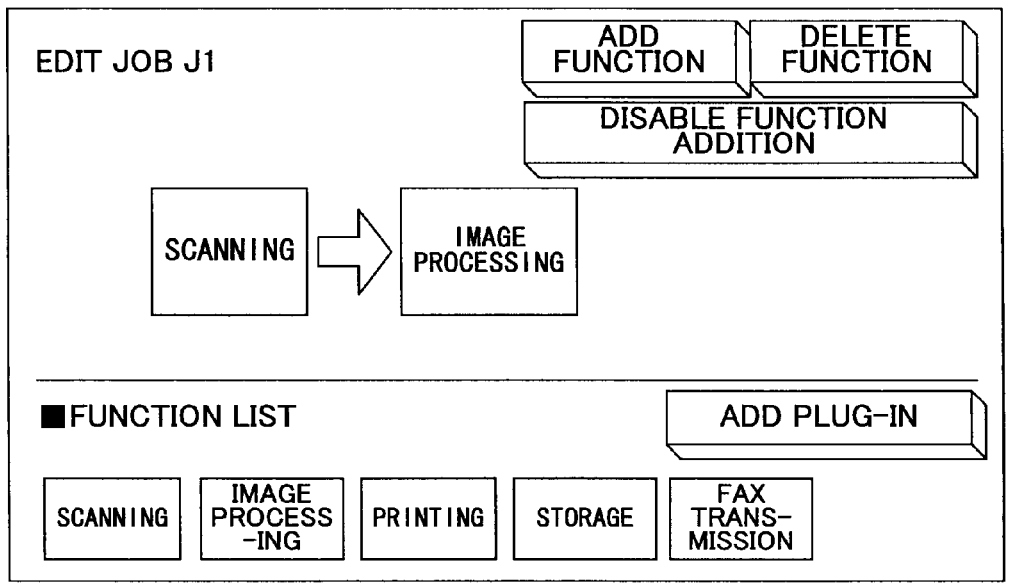
FIGS. 18A through 18C are drawings illustrating exemplary screens used in the exemplary process shown in FIG. 17.
Figure 18B:
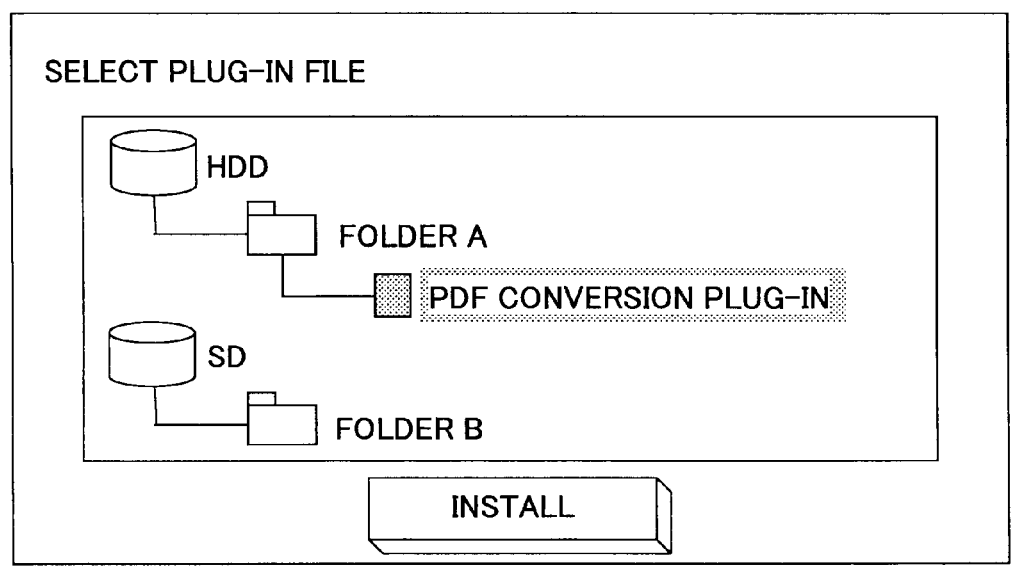

In FIG. 17, when a user presses an Add Plug-in button on a job edit screen (step S241), the display/operations control unit 111 displays a plug-in selection screen (step S242). FIG. 18A shows an exemplary job edit screen. Pressing an Add Plug-in button on the job edit screen displays a plug-in selection screen as shown in FIG. 18B.

Referring back to FIG. 17, when the user selects a plug-in on the plug-in selection screen and presses an Install button (shown in FIG. 18B) (step S243), the display/operations control unit 111 sends the function management unit 122 a request to add the selected plug-in together with the pathname of the plug-in (step S244).

The function management unit 122 sends a request for the plug-in together with the pathname to the storage control unit 151 (step S245). The storage control unit 151 returns a plug-in file corresponding to the requested plug-in to the function management unit 122 (step S246).

Figure 18C:
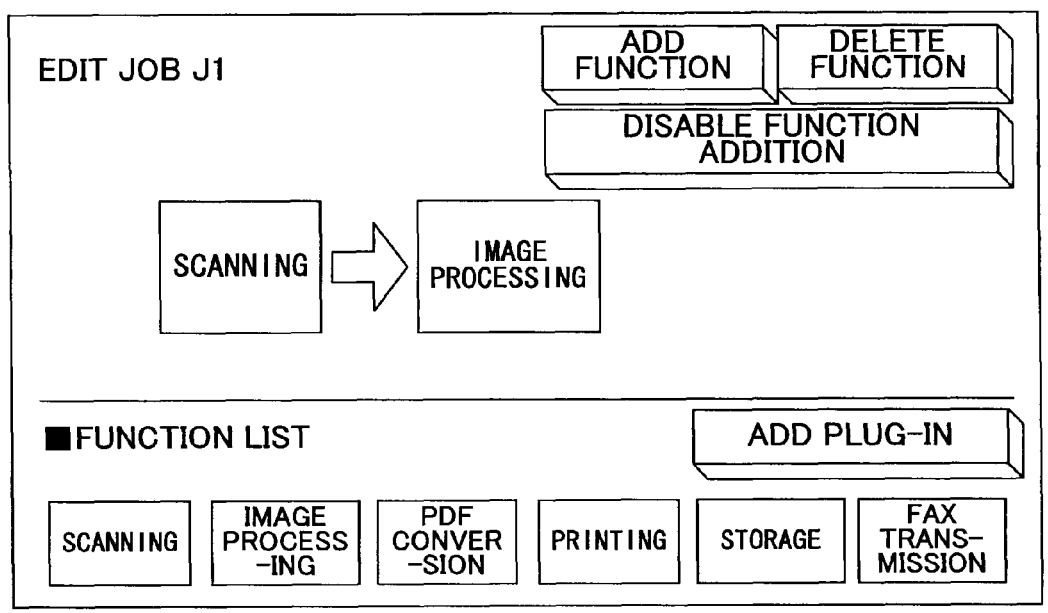

The function management unit 122 installs the plug-in (or the function) from the obtained plug-in file (step S247) and sends an installation completion report to the display/operations control unit 111 (step S248). Then, the display/operations control unit 111 updates the job edit screen (step S249). FIG. 18C shows an example of the updated job edit screen where a PDF conversion function is added to the function list.

Figure 19:
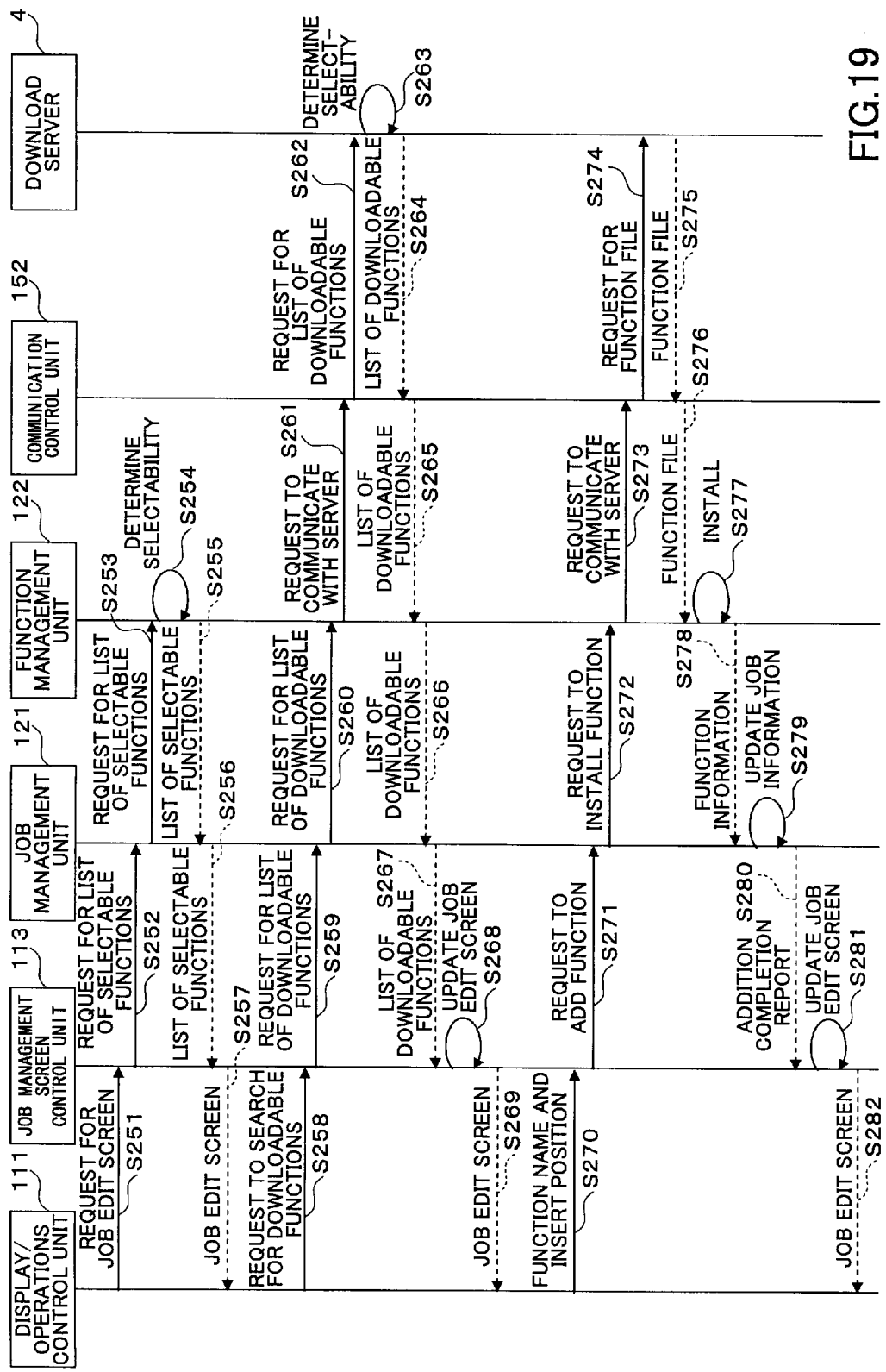
FIG. 19 is a sequence chart showing an exemplary process of installing a new function from a download server.

FIG. 19 is a sequence chart showing an exemplary process of installing a new function from the download server 4.

In FIG. 19, the display/operations control unit 111 requests the job management screen control unit 113 to display a job edit screen (step S251). The job management screen control unit 113 requests the job management unit 121 to obtain a list of selectable functions that are already installed (step S252). The job management unit 121 requests the function management unit 122 to send the list of selectable functions (step S253).

Figure 20A:
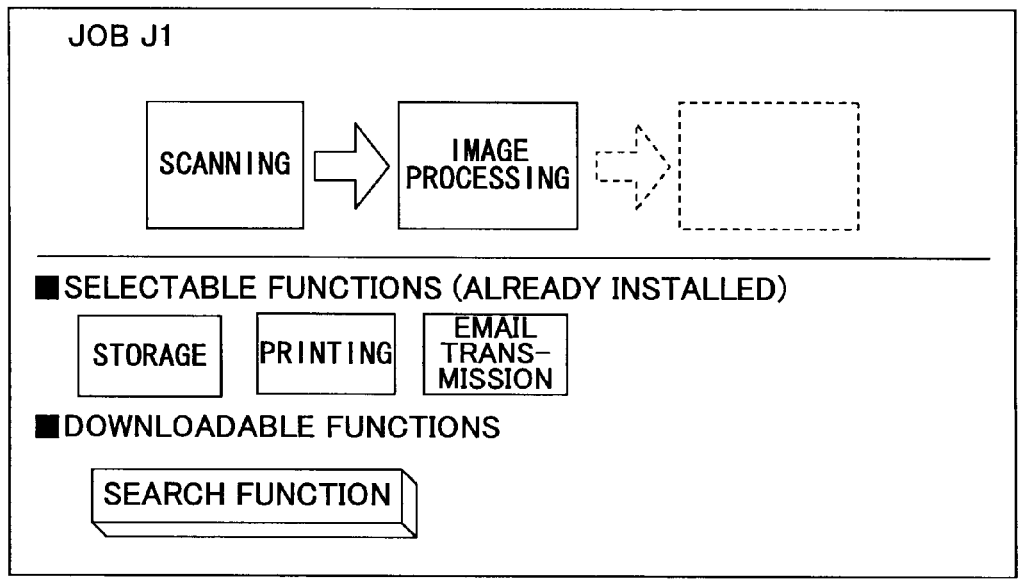
FIGS. 20A through 20B are drawings illustrating exemplary screens used in the exemplary process shown in FIG. 19.

When requested, the function management unit 122 determines whether each of installed functions is selectable (whether it can be added to the current job) (step S254) and returns the list of selectable functions to the job management unit 121 (step S255). The job management unit 121 sends the list to the job management screen control unit 113 (step S256). The job management screen control unit 113 generates a job edit screen based on the list and sends the job edit screen to the display/operations control unit 111 (step S257). FIG. 20A shows an exemplary job edit screen for the job J1. The job edit screen displays functions currently included in the job J1 and the list of selectable functions that are already installed. The job edit screen also includes a label "Downloadable functions" and a Search Function button below the label.

Referring back to FIG. 19, when the user presses the Search Function button shown in FIG. 20A, the display/operations control unit 111 requests the job management screen control unit 113 to search for functions that are selectable and downloadable (that can be added to the job J1 and downloadable from the download server 4; such functions are hereafter called downloadable functions) (step S258). The job management screen control unit 113 requests the job management unit 121 to obtain a list of downloadable functions (step S259). The job management unit 121 requests the function management unit 122 to obtain the list of downloadable functions from the download server 4 (step S260). The function management unit 122 requests the communication control unit 152 to communicate with the download server 4 (step S261). The communication control unit 152 requests the download server 4 to send the list of downloadable functions (steps S262).

When requested, the download server 4 determines whether each of stored functions is selectable (step S263) and returns the list of downloadable functions to the communication control unit 152 (step S264). The communication control unit 152 returns the list of selectable functions to the function management unit 122 (step S265). The function management unit 122 returns the list to the job management unit 121 (step 266). The job management unit 121 forwards the list to the job management screen control unit 113 (step S267).

Figure 20B:
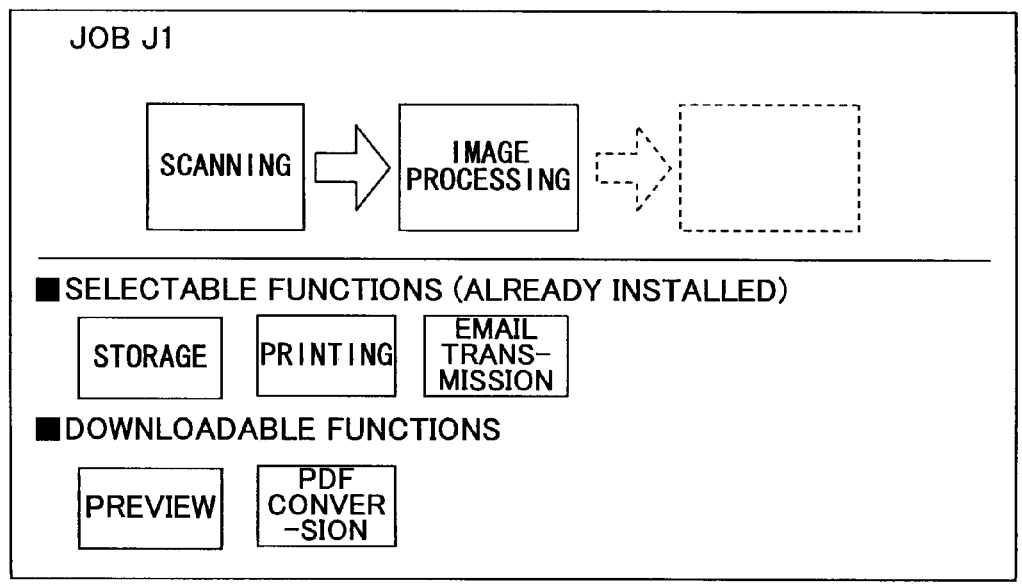

Then, the job management screen control unit 113 updates the job edit screen based on the list of downloadable functions (step S268) and sends the updated job edit screen to the display/operations control unit 111 (step S269). FIG. 20B shows an example of the updated job edit screen where a preview function and a PDF conversion function are displayed as downloadable functions.

When the user selects one of the downloadable functions on the job edit screen, the display/operations control unit 111 sends information including the name of the selected function and an insert position, where the selected function is to be inserted, to the job management screen control unit 113 (step S270). The job management screen control unit 113 requests the job management unit 121 to add the selected function based on the information sent from the display/operations control unit 111 (step S271). The job management unit 121 requests the function management unit 122 to install the selected function (step S272). The function management unit 122 requests the communication control unit 152 to communicate with the download server 4 (step S273). The communication control unit 152 requests the download server 4 to send a function file corresponding to the selected function (step S274), receives the function file (step S275), and returns the received function file to the function management unit 122 (step S276).

The function management unit 122 installs the selected function from the function file (step S277) and sends information on the installed function to the job management unit 121 (step S278).

The job management unit 121 updates the job information of the job J1 based on the information on the installed function (step S279) and returns an addition completion report to the job management screen control unit 113 (step S280). When receiving the addition completion report, the job management screen control unit 113 updates the job edit screen (step S281) and sends the updated job edit screen including the added function to the display/operations control unit 111 (step S282).

FIG. 21 is a sequence chart showing an exemplary process of installing a new function from the PC 2.

In FIG. 21, when the communication control unit 152 receives a request to install a function together with its pathname from the PC 2 (step S291), the communication control unit 152 sends an installation request together with the pathname to the display/operations control unit 111 (step S292). The display/operations control unit 111 sends the installation request together with the pathname to the function management unit 122 (step S293).

When receiving the request, the function management unit 122 requests the communication control unit 152 to download a function file corresponding to the pathname from the PC 2 (step S294) and thereby obtains the function file (step S295).

The function management unit 122 installs the requested function from the obtained function file (step S296) and sends an installation completion report to the display/operations control unit 111 (step S297). Then, the display/operations control unit 111 sends the installation completion report to the communication control unit 152 (step S298).

Next, an exemplary data structure of a function file and an exemplary process of installing a function from the function file are described.

Figure 22:
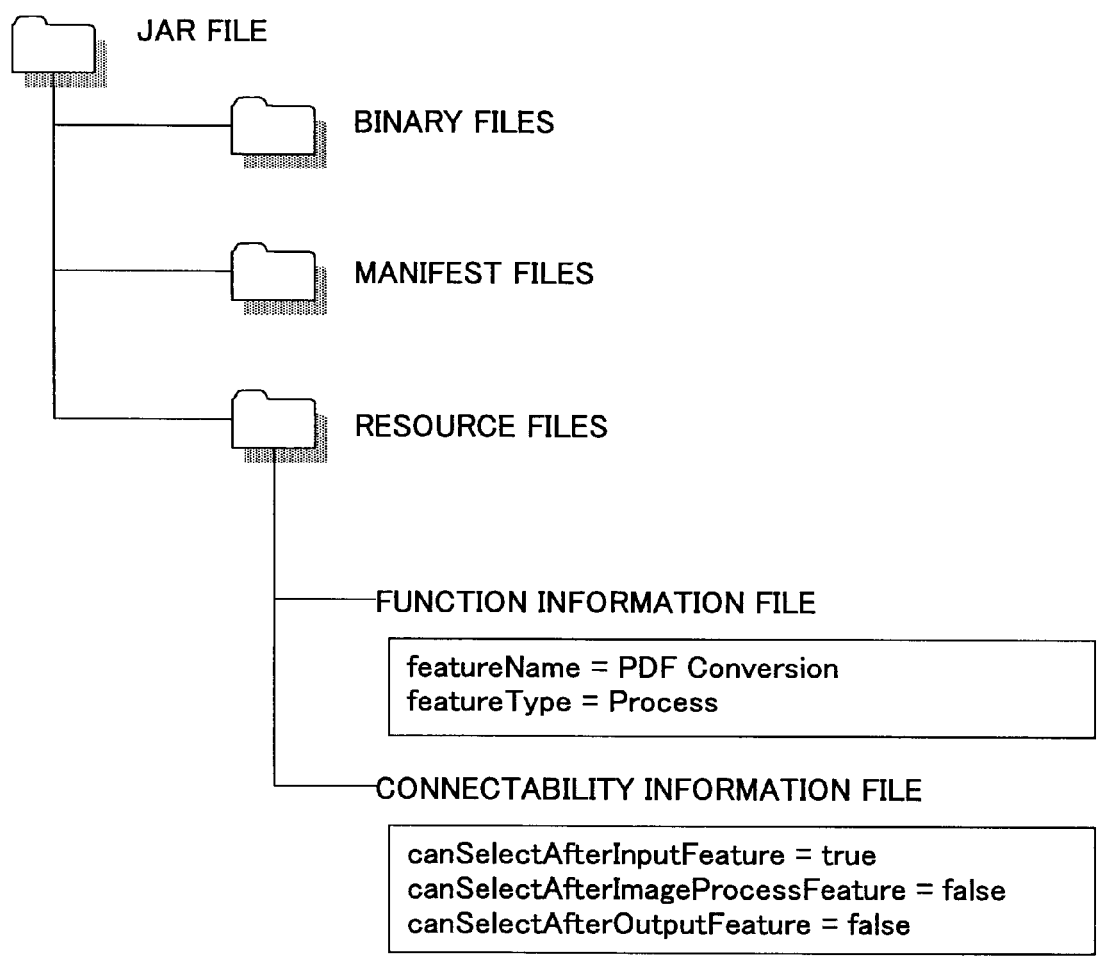
FIG. 22 is a drawing illustrating an exemplary data structure of a function file.

FIG. 22 is a drawing illustrating an exemplary data structure of a function file. In FIG. 22, a function file is implemented as a Java Archive (JAR) file. The JAR file contains binary files, manifest files, and resource files. The resource files include a function information file containing the name and type of the function, and a connectability information file regarding connectability of the function (conditions indicating whether the function can be connected to a certain type of preceding function).

Figure 23:
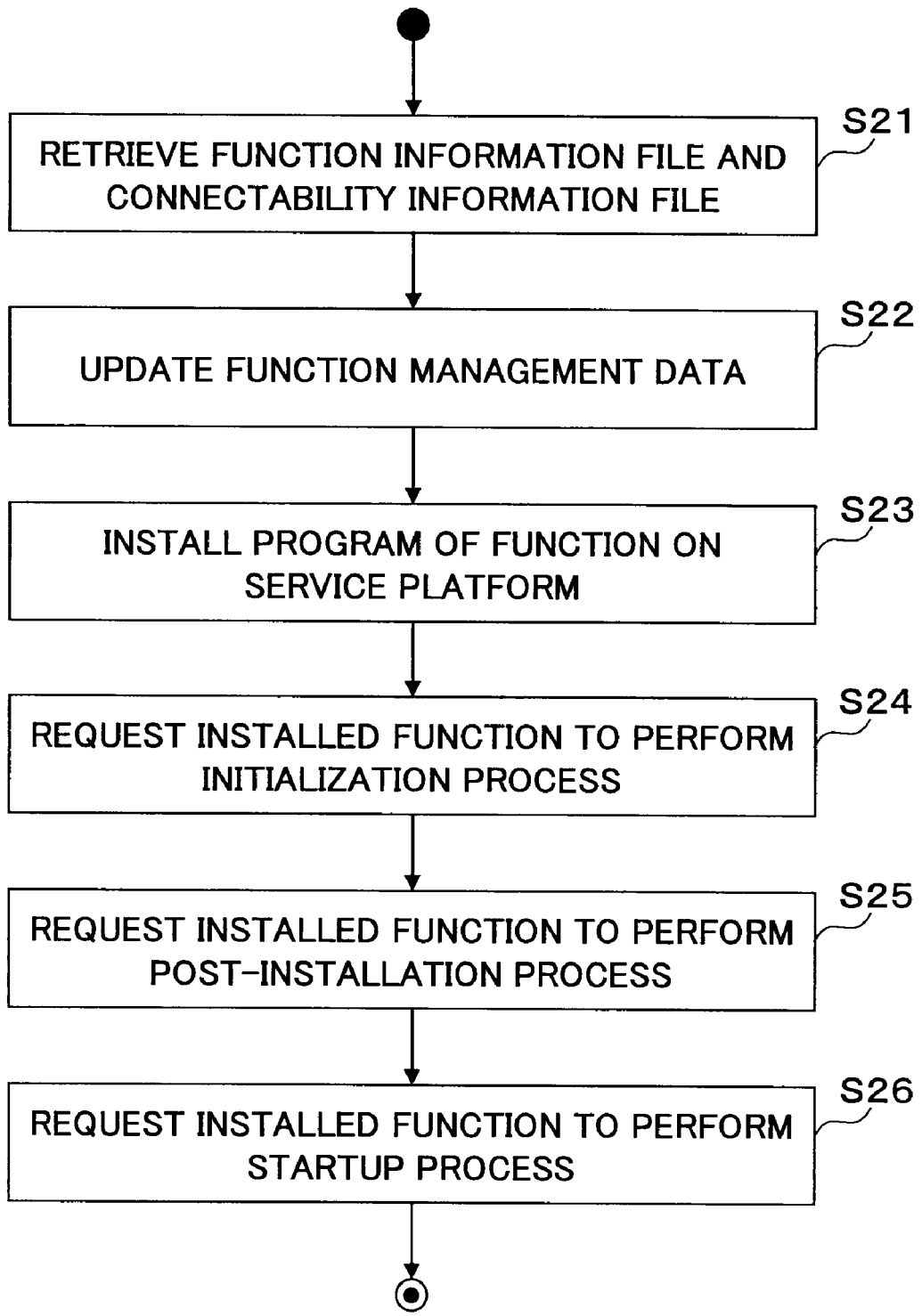
FIG. 23 is a flowchart showing an exemplary process performed by a function management unit when installing a function.

FIG. 23 is a flowchart showing an exemplary process performed by the function management unit 122 when installing a function from a function file.

In FIG. 23, the function management unit 122 retrieves the function information file and the connectability information file from a function file (step S21) and updates function management data based on information obtained from those files (step S22). The function management data correspond to the function list, the functions, and the precedable function type list shown in FIG. 4.

After step S22, the function management unit 122 installs the program of the function on a service platform from the function file (step S23). In other words, the function management unit 122 places the program in the system so that it can run on the Java Virtual Machine (Java VM).

Then, the function management unit 122 requests the installed function to perform an initialization process (step S24). For example, the function management unit 122 requests the installed function to initialize a corresponding device to make the installed function ready for execution.

After step S24, the function management unit 122 requests the installed function to perform a post-installation process that is performed only once at installation (step S25). For example, the function management unit 122 requests the installed function to register its settings.

After step S25, the function management unit 122 requests the installed function to perform a startup process that is normally performed at system startup (step S26). For example, the function management unit 122 requests the installed function to obtain IP addresses of devices.

Figure 24:
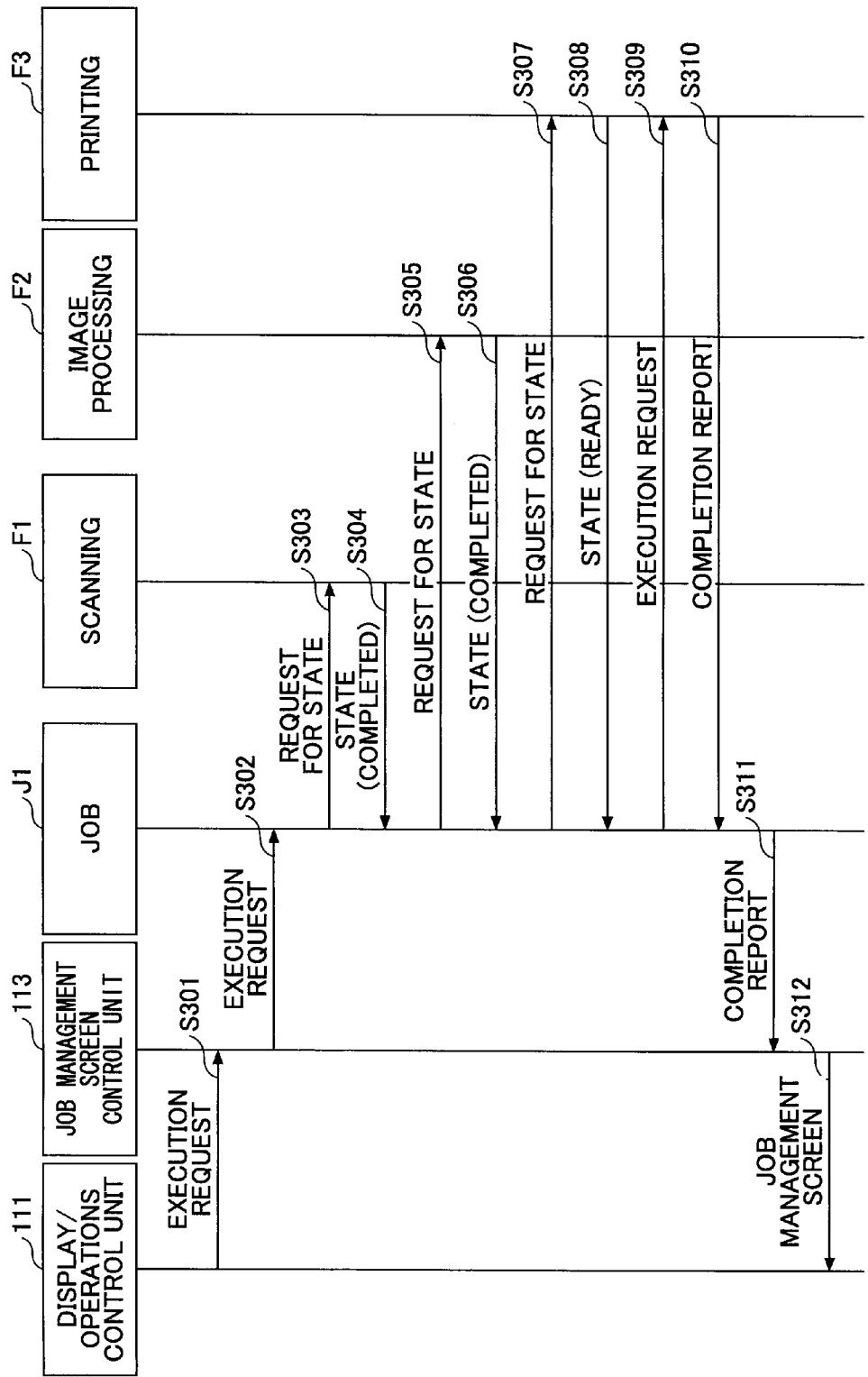
FIG. 24 is a sequence chart showing an exemplary process of executing a job.

FIG. 24 is a sequence chart showing an exemplary process of executing a job. In this exemplary process, it is assumed that a scanning function F1, an image processing function F2, and a printing function F3 are specified in a job J1 in the order mentioned.

Figure 25A:
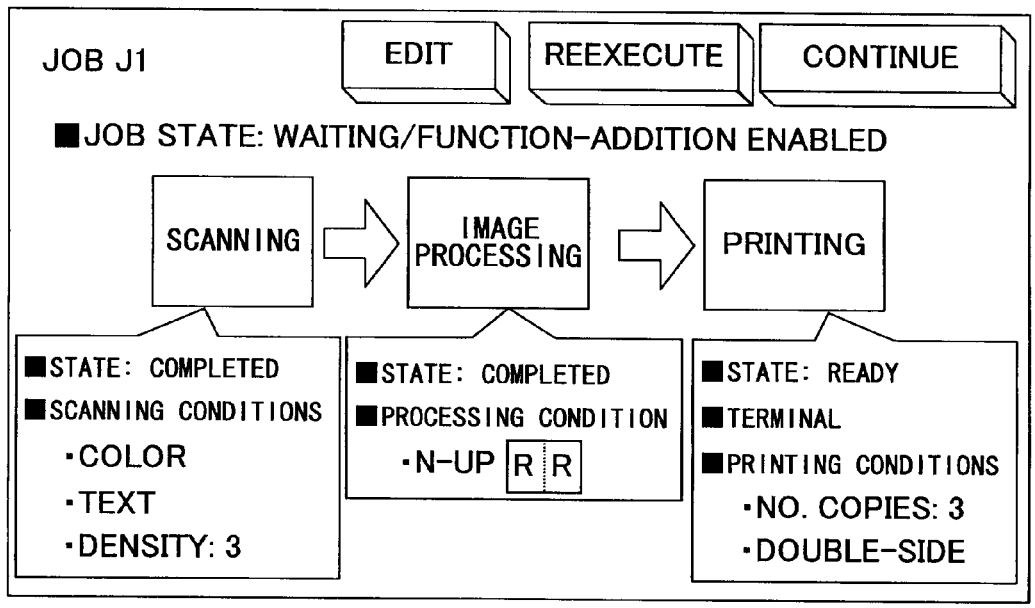
FIGS. 25A through 25D are drawings illustrating exemplary screens used in the exemplary process shown in FIG. 24.

In FIG. 24, the display/operations control unit 111 requests the job management screen control unit 113 to execute the job J1 (step S301). The job management screen control unit 113 sends an execution request to the job J1 (or to the job management unit 121) (step S302). FIG. 25A shows a job management screen for the job J1 that has been edited and is in the wait state. Pressing a Continue button on the job management screen executes the job J1.

The job J1 requests the scanning function F1 to send its state (step S303), and the scanning function F1 returns its state to the job J1 (step S304). In this exemplary process, the scanning function F1 returns "completed" as its state.

Similarly, the job J1 requests the image processing function F2 to send its state (step S305), and the image processing function F2 returns its state to the job J1 (step S306). In this exemplary process, the image processing function F2 returns "completed" as its state.

Also, the job J1 requests the printing function F3 to send its state (step S307), and the printing function F3 returns its state to the job J1 (step S308). In this exemplary process, the printing function F3 returns "ready" as its state.

Then, the job J1 sends an execution request to the printing function F3 that is in the ready state (step S309). When completing its task, the printing function F3 returns a completion report to the job J1 (step S310).

Figure 25B:
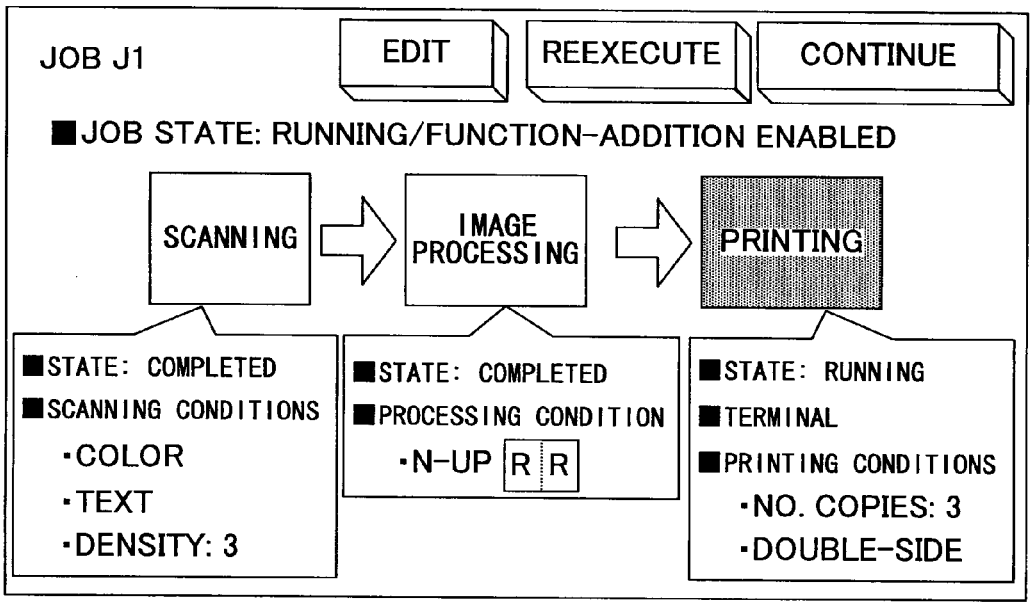
Figure 25C:
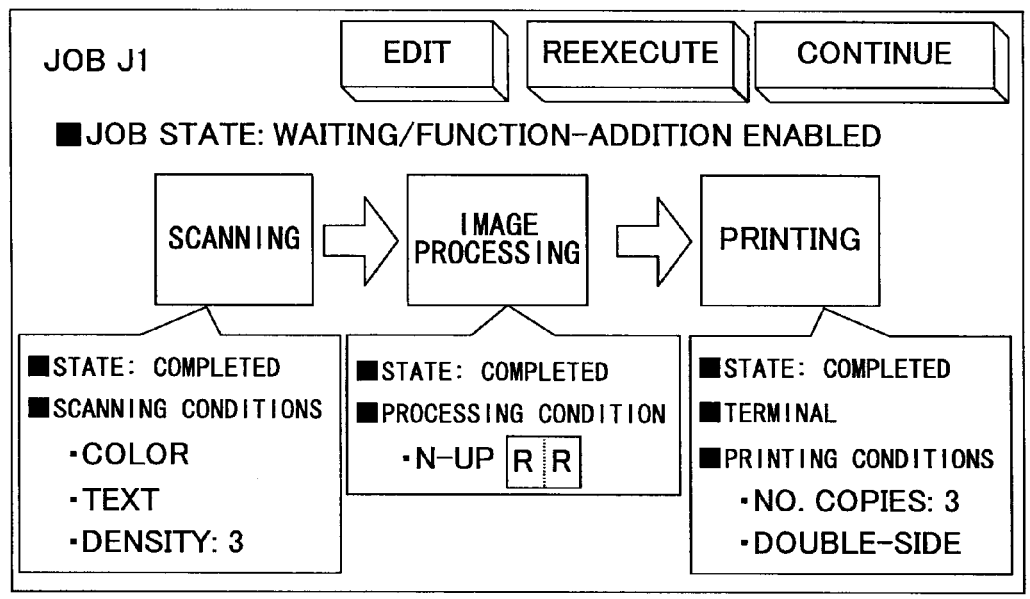
Figure 25D:
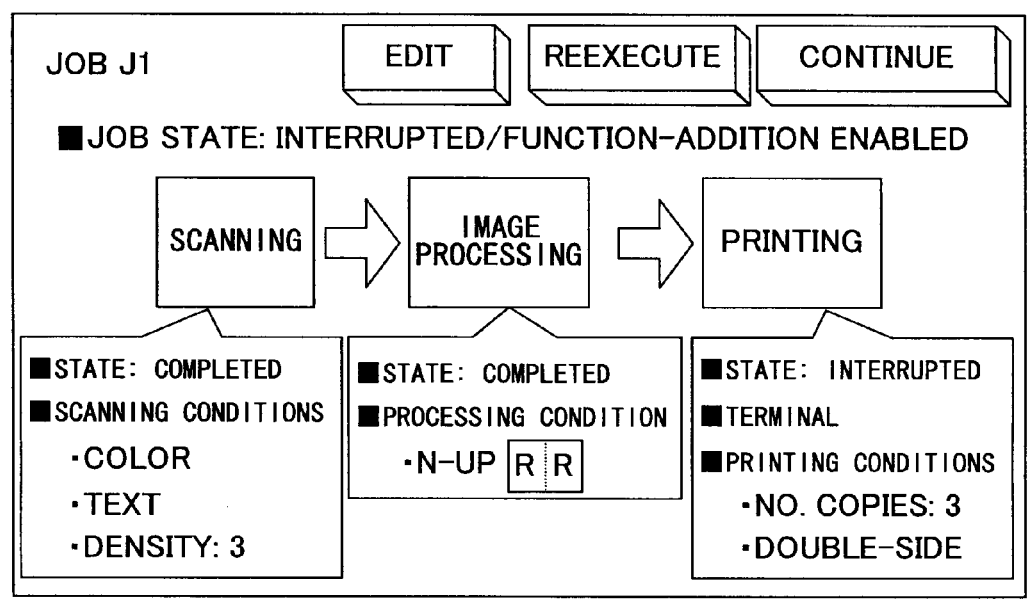

The job J1 sends the completion report to the job management screen control unit 113 (step S311). The job management screen control unit 113 updates the job management screen according to the completion report and sends the updated job management screen to the display/operations control unit 111 (step S312). Then, the display/operations control unit 111 displays the updated job management screen. FIG. 25B shows an exemplary job management screen where the printing function is in the running state, and FIG. 25C shows an exemplary job management screen where the printing function is in the completed state. In the above process, if an error such as a paper jam occurs during the execution of the printing function, a job management screen indicating that the execution of the printing function is interrupted is displayed as shown in FIG. 25D.

SUMMARY

As described above, embodiments of the present invention provide the following advantages:

(1) An embodiment of the present invention makes it possible to manage execution states of each of functions constituting a job and therefore to execute a job without fixing all of the functions constituting the job.

(2) An embodiment of the present invention makes it possible to add a new function to a job in the middle of its execution (after the execution is started) and thereby to flexibly create a job.

(3) According to an embodiment of the present invention, a job is not deleted even after execution of all functions constituting the job is completed. Therefore, a job can be used as a processing history of a document processed by the job.

(4) According to an embodiment of the present invention, even functions newly added to an image processing apparatus can be incorporated in a job.

(5) An embodiment of the present invention makes it possible to manage jobs user by user. This in turn makes it possible to start execution of a job on one user terminal and to resume the execution of the job on another user terminal.

(6) An embodiment of the present invention makes it possible for a user to create a job including functions to be executed in parallel using a graphical user interface.

(7) An embodiment of the present invention makes it possible for a user to create a job including conditional branches using a graphical user interface.

(8) An embodiment of the present invention makes it possible for a user to create a job where outputs from multiple functions are combined and input to a single function.

(9) According to an embodiment of the present invention, screen data are stored for each job. Therefore, it is possible to display a list of jobs using thumbnail images of the corresponding job management screens.

(10) According to an embodiment of the present invention, functions in a job retain their execution conditions and results even after they are executed. This configuration makes it possible to view execution conditions and results of executed functions on a job management screen.

(11) An embodiment of the present invention makes it possible to install a new plug-in function in the middle of the execution of a job (after the execution of the job is started) and to add the installed plug-in function to the job.

The present invention is not limited to the specifically disclosed embodiments, and variations and modifications may be made without departing from the scope of the present invention.

The present application is based on Japanese Priority Application No. 2006-325993 filed on Dec. 1, 2006, and Japanese Priority Application No. 2007-294844 filed on Nov. 13, 2007, the entire contents of which are hereby incorporated herein by reference.

What is claimed is:

1. An image processing apparatus where a job is implemented by one or more constituent functions, comprising:
a control unit configured to display states of the job and the constituent functions, to allow a user to identify and select one of the constituent functions and add a user-selected subsequent function after the selected one of the constituent functions concurrently with executing the job, and to receive a request to continue executing the job, at the image processing apparatus, until completion; and
a function management unit configured to determine whether to allow addition of the subsequent function based on types of the selected one of the constituent functions and the subsequent function.

2. The image processing apparatus as claimed in claim 1, wherein the control unit is configured to allow the user to specify the subsequent function as a terminal function and to reject addition of another function after the terminal function.

3. The image processing apparatus as claimed in claim 2, wherein the control unit is configured to disable addition of functions to the job if functions positioned at ends of processing paths in the job are all specified as terminal functions.

4. The image processing apparatus as claimed in claim 1, further comprising:
a job management unit configured to put the job in a function-addition-disabled state when requested by the user via the control unit and to reject addition of functions to the job if the job is in the function-addition-disabled state.

5. The image processing apparatus as claimed in claim 1, wherein the control unit is configured to request the user to log on to the image processing apparatus and to display the states of the job and the constituent functions if the logged-on user is authorized to manipulate the job.

6. The image processing apparatus as claimed in claim 1, wherein the control unit is configured to allow the user to select a new function in a storage medium, to install the selected new function, and to display the installed new function as a candidate to be added to the job.

7. The image processing apparatus as claimed in claim 1, wherein the control unit is configured to allow the user to search for new functions on a download server, to display the new functions found by the search as candidates to be added to the job, to allow the user to select one of the displayed new functions, to download the selected one of the new functions from the download server, and to install the downloaded selected one of the new functions.

8. The image processing apparatus as claimed in claim 1, wherein the control unit is configured to receive a request to install a new function from an external terminal, to download the new function from the external terminal, and to install the downloaded new function.

9. The image processing apparatus as claimed in claim 1, wherein the user that select one of the constituent functions from a device that is different from where the job is initiated.

10. A job management method in an image processing apparatus where a job is implemented by one or more constituent functions, comprising the steps of:
displaying states of the job and the constituent functions;
allowing a user to identify and select one of the constituent functions and add a user-selected subsequent function after the selected one of the constituent functions concurrently with executing the job;
receiving a request to continue executing the job, at the image processing apparatus, until completion; and
determining whether to allow addition of the subsequent function based on types of the selected one of the constituent functions and the subsequent function.

11. The job management method as claimed in claim 10, further comprising the step of:
allowing the user to specify the subsequent function as a terminal function, wherein addition of another function after the terminal function is rejected.

12. The job management method as claimed in claim 11, wherein addition of functions to the job is disabled if functions positioned at ends of processing paths in the job are all specified as terminal functions.

13. The job management method as claimed in claim 10, further comprising the step of:
allowing the user to put the job in a function-addition-disabled state, wherein addition of functions to the job is rejected if the job is in the function-addition-disabled state.

14. The job management method as claimed in claim 10, further comprising the step of:
requesting the user to log on to the image processing apparatus, wherein the states of the job and the constituent functions are displayed if the logged-on user is authorized to manipulate the job.

15. The job management method as claimed in claim 10, further comprising the steps of:
allowing the user to select a new function in a storage medium;
installing the selected new function; and
displaying the installed new function as a candidate to be added to the job.

16. The job management method as claimed in claim 10, further comprising the steps of:
allowing the user to search for new functions on a download server;

displaying the new functions found by the search as candidates to be added to the job;

allowing the user to select one of the displayed new functions;

downloading the selected one of the new functions from the download server; and installing the downloaded selected one of the new functions.

17. The job management method as claimed in claim 10, further comprising the steps of:

receiving a request to install a new function from an external terminal;

downloading the new function from the external terminal; and installing the downloaded new function.

18. A storage medium having program code embodied therein for causing a computer to function as a control unit of an image processing apparatus in which a job is implemented by one or more constituent functions, wherein the control unit is configured to display states of the job and the constituent functions, to allow a user to identify and select one of the constituent functions and add a user-selected subsequent function after the selected one of the constituent functions concurrently with executing the job, and to receive a request to execute the job, at the image processing apparatus, until completion, and wherein a function management unit is configured to determine whether to allow addition of the subsequent function based on types of the selected one of the constituent functions and the subsequent function.

19. An image processing apparatus where a job is implemented by one or more constituent functions, comprising:

a control unit configured to display states of the job and the constituent functions, to allow a user to identify and select one of the constituent functions and add a user-selected subsequent function after the selected one of the constituent functions concurrently with executing the job, and to receive a request to continue executing the job, at the image processing apparatus, until completion, wherein the control unit is configured to allow the user to specify the subsequent function as a terminal function and to reject addition of another function after the terminal function and to disable addition of functions to the job if functions positioned at ends of processing paths in the job are all specified as terminal functions.

20. An image processing apparatus where a job is implemented by one or more constituent functions, comprising:

a control unit configured to display states of the job and the constituent functions, to allow a user to identify and select one of the constituent functions and add a user-selected subsequent function after the selected one of the constituent functions concurrently with executing the job, and to receive a request to continue executing the job, at the image processing apparatus, until completion, wherein the control unit is configured to allow the user to search for new functions on a download server, to display the new functions found by the search as candidates to be added to the job, to allow the user to select one of the displayed new functions, to download the selected one of the new functions from the download server, and to install the downloaded selected one of the new functions.

* * * * *